United States Patent
Lei et al.

(10) Patent No.: US 12,170,574 B2
(45) Date of Patent: Dec. 17, 2024

(54) METHOD AND APPARATUS FOR HARQ-ACK RETRANSMISSION

(71) Applicant: LENOVO (BEIJING) LIMITED, Beijing (CN)

(72) Inventors: Haipeng Lei, Beijing (CN); Alexander Golitschek Edler Von Elbwart, Darmstadt (DE)

(73) Assignee: Lenovo (Beijing) Limited, Beijing (CN)

( * ) Notice: Subject to any disclaimer, the term of this patent is extended or adjusted under 35 U.S.C. 154(b) by 628 days.

(21) Appl. No.: 17/608,094

(22) PCT Filed: May 10, 2019

(86) PCT No.: PCT/CN2019/086458
§ 371 (c)(1),
(2) Date: Nov. 1, 2021

(87) PCT Pub. No.: WO2020/227863
PCT Pub. Date: Nov. 19, 2020

(65) Prior Publication Data
US 2022/0294573 A1    Sep. 15, 2022

(51) Int. Cl.
*H04L 1/1829* (2023.01)
*H04L 1/1607* (2023.01)
*H04L 1/1812* (2023.01)

(52) U.S. Cl.
CPC .......... *H04L 1/1854* (2013.01); *H04L 1/1621* (2013.01); *H04L 1/1671* (2013.01); *H04L 1/1812* (2013.01)

(58) Field of Classification Search
None
See application file for complete search history.

(56) References Cited

U.S. PATENT DOCUMENTS

2016/0261391 A1    9/2016    Chen et al.
2017/0134140 A1    5/2017    Park
(Continued)

FOREIGN PATENT DOCUMENTS

CN          101222304 A       7/2008

OTHER PUBLICATIONS

LG Electronics, HARQ procedure for NR-U, 3GPP TSG RAN WG1 #97, R1-1906677, May 13-17, 2019, pp. 1-17, Reno, USA.
(Continued)

*Primary Examiner* — Alpus Hsu
*Assistant Examiner* — Camquyen Thai
(74) *Attorney, Agent, or Firm* — Kunzler Bean & Adamson

(57) ABSTRACT

The present application relates to methods and apparatuses. According to some embodiments of the disclosure, the method includes: receiving a first group of downlink transmissions; transmitting a first HARQ-ACK codebook for the first group of downlink transmissions in response to channel access procedure for transmitting the first HARQ-ACK codebook being successful; receiving a second group of downlink transmissions; determining whether to retransmit HARQ-ACK feedback for the first group of downlink transmissions; transmitting a combined HARQ-ACK codebook in response to determining to retransmit the HARQ-ACK feedback for the first group of downlink transmissions and channel access procedure for transmitting the combined HARQ-ACK codebook being successful, wherein the combined HARQ-ACK codebook includes a first sub-codebook corresponding to the first group of downlink transmissions and a second sub-codebook corresponding to the second group of downlink transmissions; and transmitting a second HARQ-ACK codebook for the second group of downlink transmissions in response to determining not to retransmit (Continued)

PDSCH

PUCCH the HARQ-ACK feedback for the first group of downlink transmissions and channel access procedure for transmitting the second HARQ-ACK codebook being successful.

20 Claims, 13 Drawing Sheets

(56) References Cited

U.S. PATENT DOCUMENTS

| | | |
|---|---|---|
| 2019/0081764 A1* | 3/2019 | Guan .................. H04L 1/16 |
| 2019/0089494 A1 | 3/2019 | Park et al. |
| 2020/0228248 A1* | 7/2020 | Islam .................. H04L 5/0055 |

OTHER PUBLICATIONS

Spreadtrum Communications, Discussion on HARQ enhancements for NR-U, 3GPP TSG RAN WG1 Meeting #97, R1-1906383, May 13-17, 2019, pp. 1-4, Reno, USA.

International Searching Authority, "Written Opinion of the International Searching Authority," PCT/CN2019/086458, Jan. 20, 2020, pp. 1-4.

Ericsson, HARQ and scheduling enhancements for NR-U, 3GPP TSG-RAN WG1 Meeting #97, R1-1907456, May 13-17, 2019, pp. 1-15, Reno, NV, USA.

* cited by examiner

METHOD AND APPARATUS FOR HARQ-ACK RETRANSMISSION

TECHNICAL FIELD

The present disclosure generally relates to HARQ-ACK retransmission, and relates more particularly HARQ-ACK retransmission on unlicensed spectrum.

BACKGROUND OF THE INVENTION

Techniques of Hybrid Automatic Repeat reQuest (HARQ) are introduced in New Radio access on Unlicensed spectrum (NR-U) network of the fifth generation of cellular mobile communications. In particular, under a NR-U network architecture, it is specified that Physical Downlink Shared Channel (PDSCH) grouping is explicitly indicated by a group index in Downlink Control Information (DCI) which is used for scheduling PDSCH, and a base station can request HARQ acknowledgement (HARQ-ACK) feedback in a same Physical Uplink Control Channel (PUCCH) or Physical Uplink Shared Channel (PUSCH) for all PDSCHs in same PDSCH group.

When the base station fails to receive or decode an HARQ-ACK feedback transmitted from a user equipment, the HARQ-ACK feedback needs to be retransmitted. However, there are still issues of triggering a user equipment to retransmit the HARQ-ACK feedback and these issues need to be solved.

BRIEF SUMMARY OF THE INVENTION

One embodiment of the present disclosure provides a method for wireless communications by a user equipment. The method includes: receiving a first group of downlink transmissions; transmitting a first HARQ-ACK codebook for the first group of downlink transmissions in response to channel access procedure for transmitting the first HARQ-ACK codebook being successful; receiving a second group of downlink transmissions; determining whether to retransmit HARQ-ACK feedback for the first group of downlink transmissions; transmitting a combined HARQ-ACK codebook in response to determining to retransmit the HARQ-ACK feedback for the first group of downlink transmissions and channel access procedure for transmitting the combined HARQ-ACK codebook being successful, wherein the combined HARQ-ACK codebook includes a first sub-codebook corresponding to the first group of downlink transmissions and a second sub-codebook corresponding to the second group of downlink transmissions; and transmitting a second HARQ-ACK codebook for the second group of downlink transmissions in response to determining not to retransmit the HARQ-ACK feedback for the first group of downlink transmissions and channel access procedure for transmitting the second HARQ-ACK codebook being successful.

Another embodiment of the present disclosure provides a method for wireless communications by a base station. The method includes: transmitting, to a user equipment, a first group of downlink transmissions; receiving, from the user equipment, a first HARQ-ACK codebook for the first group of downlink transmissions; determining whether to request the user equipment to retransmit HARQ-ACK feedback for the first group of downlink transmissions; transmitting, to the user equipment, a second group of downlink transmissions; receiving, from the user equipment, a combined HARQ-ACK codebook in response to determining to request the user equipment to retransmit HARQ-ACK feedback for the first group of downlink transmissions, wherein the combined HARQ-ACK codebook includes a first sub-codebook corresponding to the first group of downlink transmissions and a second sub-codebook corresponding to the second group of downlink transmissions; receiving, from the user equipment, a second HARQ-ACK codebook for the second group of downlink transmissions in response to determining not to request the user equipment to retransmit HARQ-ACK feedback for the first group of downlink transmissions.

Yet another embodiment of the present disclosure provides an apparatus. According to an embodiment of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, cause the apparatus to perform a method according to an embodiment of the present disclosure.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION OF THE, INVENTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
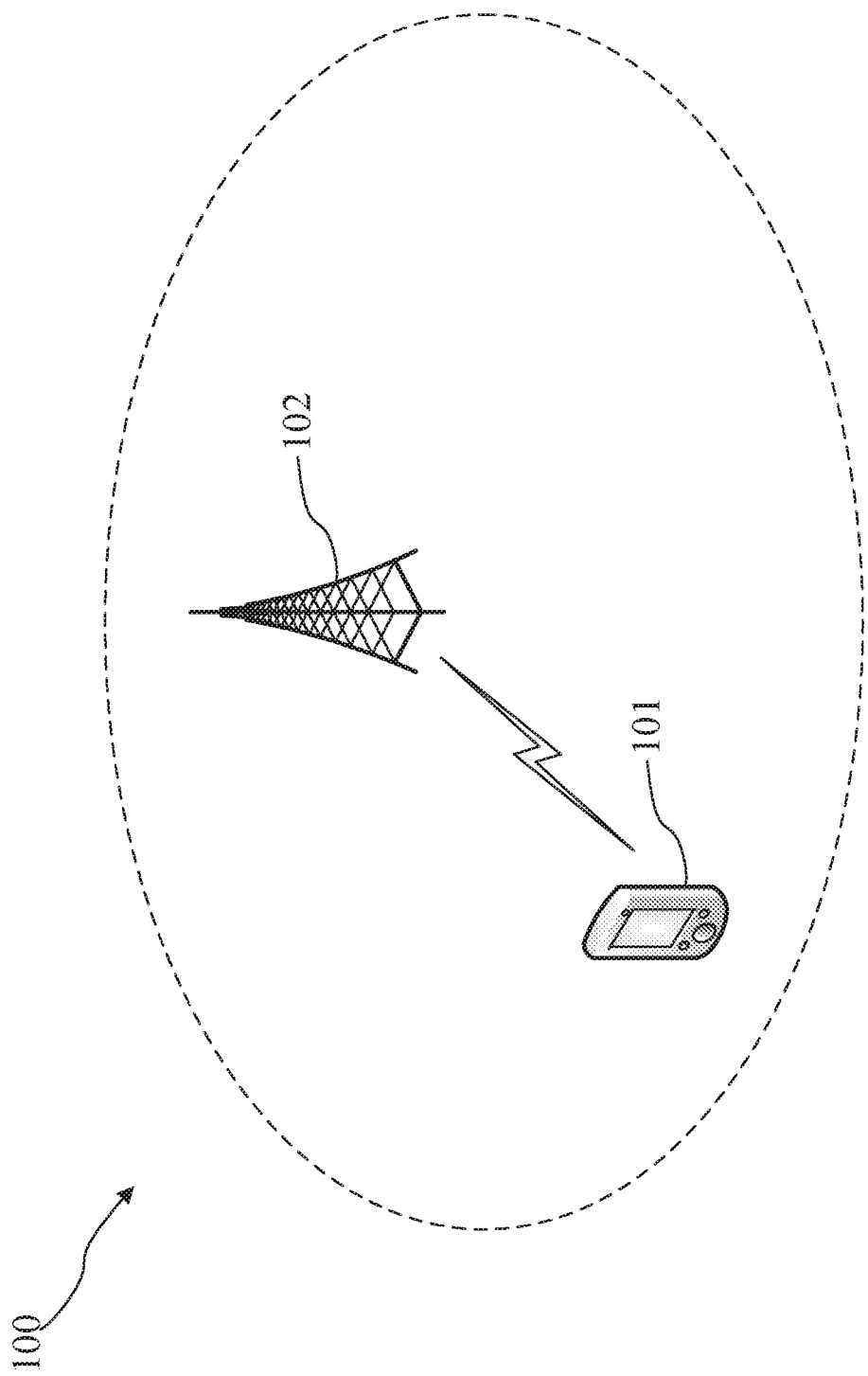
FIG. 1 illustrates a wireless communication system according to an embodiment of the present disclosure.

As shown in FIG. 1, a wireless communication system 100 includes a user equipment (UE) 101 and a base station (BS) 102. Although a specific number of UE 101 and BS 102 are depicted in FIG. 1, it is contemplated that any number of UEs 101 and BSs 102 may be included in the wireless communication system 100.

UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present application, UE 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, UE 101 includes wearable devices, such as smart watches, fitness bands, optical head-mounted displays, or the like. Moreover, UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art. LE 101 may communicate directly with BSs 102 via uplink communication signals.

BS 102 may be distributed over a geographic region. In certain embodiments of the present application, BS 102 may also be referred to as an access point, an access terminal, a base, a base unit, a macro cell, a Node-B, an evolved Node B (eNB), a gNB, a Home Node-B, a relay node, or a device, or described using other terminology used in the art. BS 102 is generally part of a radio access network that may include one or more controllers communicably coupled to one or more corresponding BS(s) 102.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G new radio of the 3GPP protocol, wherein BSs 102 transmit data using an OFDM modulation scheme on the DL and LE 101 transmit data on the UL using a single-carrier frequency division multiple access (SC-FDMA) or OMNI scheme. More generally, however, the wireless communication system 100 may implement some other open or proprietary communication protocols, for example, WiMAX, among other protocols.

In some embodiments of the present application, BS 102 may communicate using other communication protocols, such as the IEEE 802.11 family of wireless communication protocols. Further, in some embodiments of the present application, BS 102 may communicate over licensed spectrums, whereas in other embodiments BS 102 may communicate over unlicensed spectrums. The present application is not intended to be limited to the implementation of any particular wireless communication system architecture or protocol. In yet some embodiments of present application, BS 102 may communicate with UE 101 using the 3GPP 50 protocols.

According to existing agreements, for dynamic Hybrid Automatic Repeat request (HARQ) codebook, Physical Downlink Shared Channel (PDSCH) grouping is explicitly indicated by a group index in Downlink Control Information (DCI) scheduling the PDSCH, and BS 102 may request HARQ-acknowledgement (HARQ-ACK) feedback in a same Physical Uplink Control Channel (PUCCH) for all PDSCHs in the same group. However, there are still some issues on how to trigger UE 101 to retransmit an earlier HARQ-ACK feedback.

For instance, when BS 102 receives a PUCCH carrying the HARQ-ACK feedback for one PDSCH group, it takes some time for BS 102 to process the PUCCH and decode the HARQ-ACK information bits. Accordingly, BS 102 may not know whether the received HARQ-ACK feedback needs to be retransmitted or not when BS 102 prepares a Downlink (DL) grant and associated PDSCH(s) in next PDSCH group.

Figure 2:
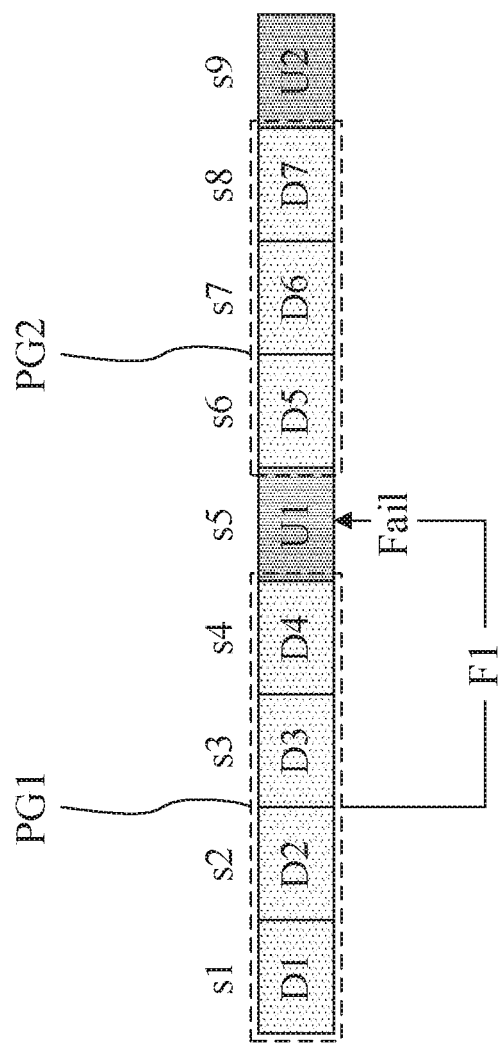
FIG. 2 is a schematic view of HARQ-ACK feedback transmission between a user equipment and a base station.

As shown in FIG. 2, when a first HARQ-ACK feedback F1 corresponding to a group PG1 of PDSCHs (which are transmitted via downlink transmissions D1 to D4) in slot s1, s2, s3 and s4 is transmitted in slot s5 by UE 101, BS 102 may not know whether the first HARQ-ACK feedback can be successfully decoded in slot s5. Further, BS 102 may schedule PDSCHs (which are to be transmitted via downlink transmissions D5 to D7) in a group PG2 from slot s6 to s8. Then, in slot s7, assuming BS 102 knows that the first HARQ-ACK feedback F1 is not decoded successfully, BS 102 may need to trigger LIE 101 to retransmit the first HARQ-ACK feedback F1. Therefore, the problem is how to send a triggering signaling to UE 101 for retransmission of HARQ-ACK feedback.

Figure 3A:
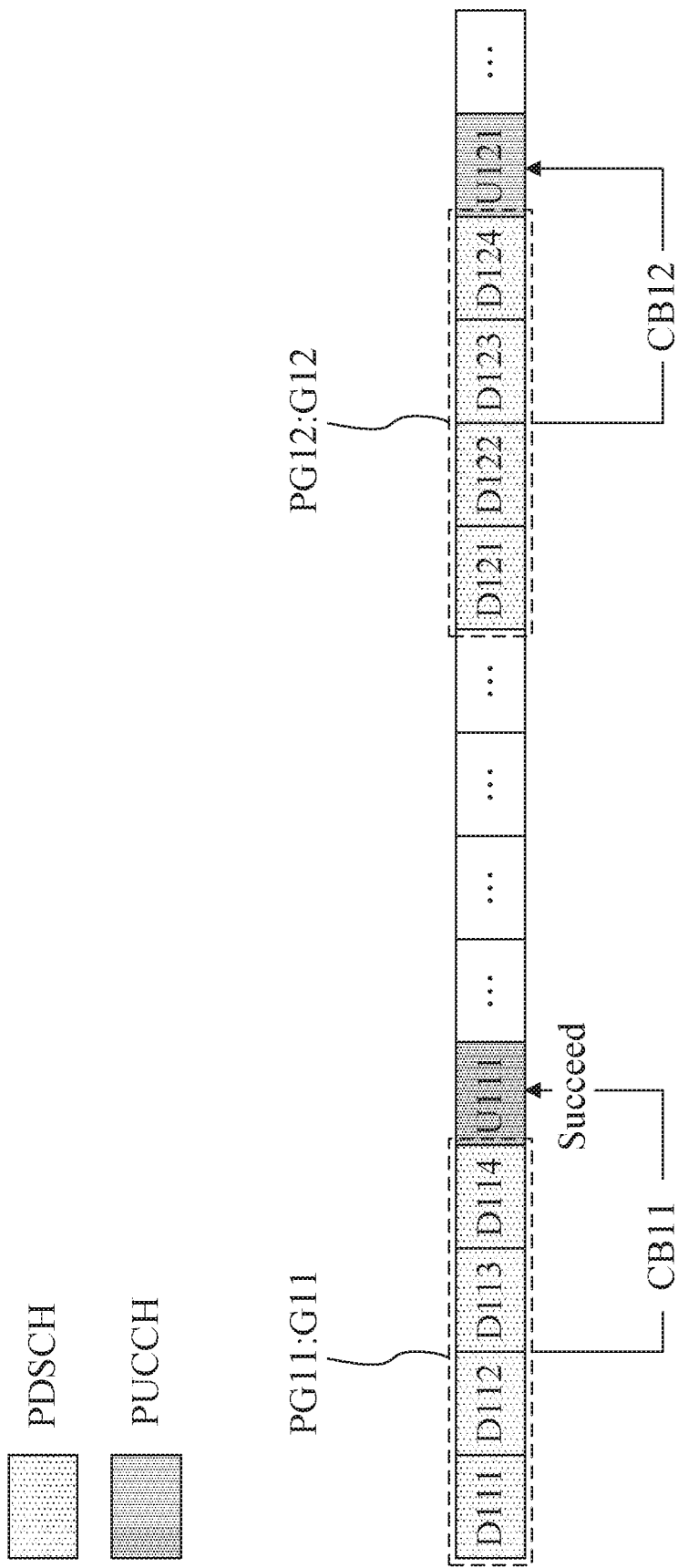
FIGS. 3A and 3B are schematic views of HARQ-ACK codebook transmission between a user equipment and a base station according to an embodiment of the present disclosure.
Figure 3B:
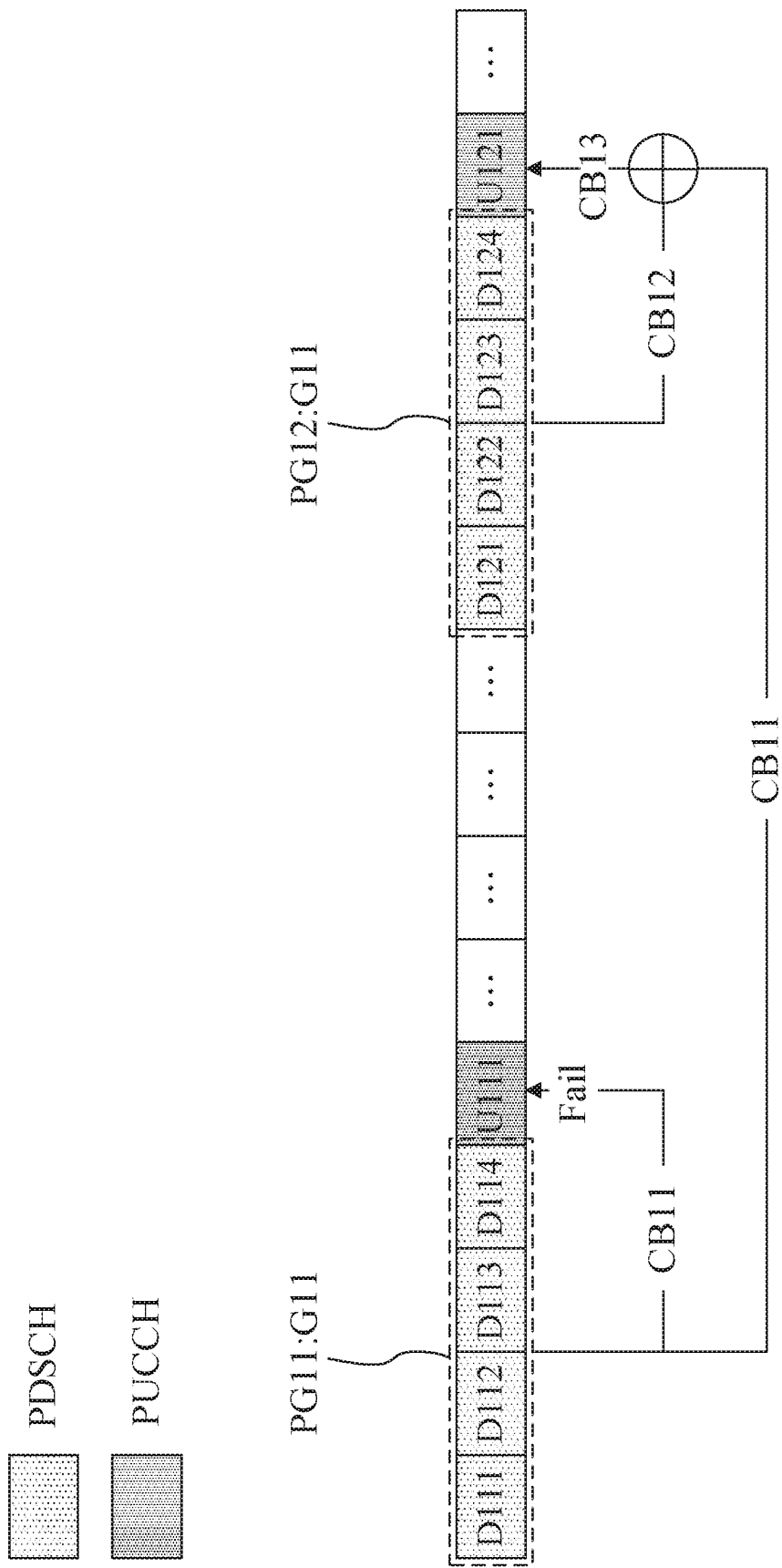

FIG. 3A to FIG. 3B are schematic views of HARQ-ACK codebook transmission between UE 101 and BS 102 according to some embodiments of the present disclosure. In these embodiments, a counter-based group index may be introduced for triggering signaling to UE 101 for retransmission of HARQ-ACK feedback.

In some embodiments, BS 102 transmits a first PDSCH group PG11 of PDSCHs to UE 101 via downlink transmissions D111 to D114. Each PDSCH of the first PDSCH group PG11 may be associated with a same group index G11 and the group index G11 may be included in DCI scheduling the associated PDSCH. In other words, the PDSCHs associated with the same group index G11 may be grouped in the same PDSCH group PG11. In some embodiments, value of group index may be cyclically incremented from one group to a next group.

For example, assuming two bits are used as group index, then up to four PDSCH groups may be supported. The value of group index may be selected from one of {0, 1, 2, 3}. Because value of group index may be cyclically incremented from one PDSCH group to a next PDSCH group, a first PDSCH group with value "0" may follow a fourth PDSCH group with value "3", or a fifth PDSCH group following the fourth PDSCH group may be indicated with same group index value "0" as the first PDSCH group, like modulo operation by four. Alternatively, the value of group index may be selected from one of {1, 2, 3, 4}. Because value of group index may be cyclically incremented from one PDSCH group to a next PDSCH group, a first PDSCH group with value "1" may follow a fourth PDSCH group with value "4", or a fifth PDSCH group following the fourth PDSCH group may be indicated with same group index value "1" as the first PDSCH group, like modulo operation by four. For simplicity, group index value of {0, 1, 2, 3} is used as an example in the following, which does not exclude the usage of group index value of {1, 2, 3, 4}.

After receiving the first PDSCH group PG11, UE 101 may generate HARQ-ACK feedback for the first PDSCH group PG11 and obtain a first HARQ-ACK codebook CB11. Then, UE 101 transmits the first HARQ-ACK codebook CB11 to BS 102 in response to channel access procedure for transmitting the first HARQ-ACK codebook CB11 being successful.

Please refer to FIG. 3A. In detail, in some embodiments, when BS 102 receives a PUCCH carrying the first HARQ-ACK codebook CB11 for the first PDSCH group PG11 via an uplink transmission UHT and decodes the first HARQ-ACK codebook CB11 successfully, BS 102 may determine not to request UE 101 to retransmit the HARQ-ACK feedback for the first PDSCH group PG11.

More specifically, in these embodiments, when BS 102 determines not to request UE 101 to retransmit the HARQ-ACK feedback for the first PDSCH group PG11, BS 102 may indicate a group index G12, which is different from the group index G1*l* associated with the first PDSCH group PG11, to a second PDSCH group PG12 of PDSCHs and transmits the second PDSCH group PG12 to UE 101 via downlink transmissions D121 to D124.

In some embodiments, there may be at least one PDSCH group being transmitted between the transmission of the first PDSCH group PG11 and the transmission of the second PDSCH group PG12 and BS 102 may receive and decode first HARQ-ACK codebook CB11 successfully during the transmission of the at least one PDSCH group. The group indexes of these PDSCH groups are indicated in order according to the transmission order. That is, when there is one PDSCH group with a group index GX being transmitted between the transmission of the first PDSCH group PG11 and the transmission of the second PDSCH group PG12, the group index t H, GX and G12 are accumulated in order. For instance, the group index G11, GX and G12 may be "0", "1", and "2". Such a situation will be detailed described in FIG. 4A and FIG. 4B.

When LIE 101 receives the second PDSCH group PG12, UE 101 may determine whether to retransmit HARQ-ACK feedback for the first PDSCH group PG11 according to the group index associated with the second PDSCH group PG12. In particular, because BS 102 indicates the group index G12 for the second PDSCH group PG12 and the group index G12 is different from the group index G11 associated with the first PDSCH group PG11, UE 101 determines not to retransmit HARQ-ACK feedback for the first PDSCH group PG11 accordingly.

Next, UE 101 obtains a second HARQ-ACK codebook CB12 for the second PDSCH group PG12 in response to determining not to retransmit HARQ-ACK feedback for the first PDSCH group PG11, and then UE 101 transmits the second HARQ-ACK codebook CB12 to BS 102 in a PUCCH via an uplink transmission U121. Subsequently, BS 102 receives the second HARQ-ACK codebook CB12 from UE 101.

For example, assuming two bits are used as group index. The group index may be selected from one of {0, 1, 2, 3}. When BS 102 determines not to request UE 101 to retransmit the HARQ-ACK feedback for the first PDSCH group PG11 and the group index of the first PDSCH group PG11 is "0", BS 102 then selects a group index different from "0" and indicates this group index to the second PDSCH group PG12. In particular, based on the order of being transmitted, BS 102 selects "2" for the group index and indicates the group index "2" to the second PDSCH group PG12.

Next, BS 102 transmits the second PDSCH group PG12 to UE 101.

Accordingly, when UE 101 receives the second PDSCH group PG12, UE 101 determines not to retransmit HARQ-ACK feedback for the first PDSCH group PG11 since the group index "2" of the second PDSCH group PG12 is different from the group index "0" of the first PDSCH group PG11.

In some embodiments, when BS 102 receives and decodes the first HARQ-ACK codebook CB11 successfully, BS 102 may indicate UE 101 to clear the first HARQ-ACK codebook CB11 from a buffer (not shown) of UE 101.

Subsequently, UE 101 may clear the first HARQ-ACK codebook CB11 from the buffer.

Please refer to FIG. 3B. On the other hand, in some embodiments, when BS 102 fails to receive or decode the first HARQ-ACK codebook CB11 carried in the corresponding PUCCH, BS 102 may determine to request UE 101 to retransmit the HARQ-ACK feedback for the first PDSCH group PG11.

More specifically, in these embodiments, when BS 102 determines to request UE 101 to retransmit the HARQ-ACK feedback for the first PDSCH group PG11, BS 102 may indicate the group index G11 of the first PDSCH group PG11 to the second PDSCH group PG12 and transmits the second PDSCH group PG12 to UE 101 via downlink transmissions D121 to D174.

When UE 101 receives the second PDSCH group PG12, UE 101 may determine whether to retransmit HARQ-ACK feedback for the first PDSCH group PG11 according to the group index of the second PDSCH group PG12. In particular, because BS 102 indicates the group index G11 to the second PDSCH group PG12 and the group index G11 has been indicated to the first PDSCH group PG1.1, UE 101 may determine to retransmit HARQ-ACK feedback for the first PDSCH group PG11 accordingly.

Next, UE 101 obtains a combined HARQ-ACK codebook CB13 for the first PDSCH group Pt and the second PDSCH group PG12 in response to determining to retransmit HARQ-ACK feedback for the first PDSCH group PG11, and then UE 101 transmits the combined HARQ-ACK codebook CB13 to BS 102 in the PUCCH via the uplink transmission U121. Subsequently, BS 102 receives the combined HARQ-ACK codebook CB13 from UE 101. In some embodiments, the combined HARQ-ACK codebook CB13 includes a first sub-codebook corresponding to the first PDSCH group PG11 and a second sub-codebook corresponding to the second PDSCH group PG12. In other words, the combined HARQ-ACK codebook CB13 includes the first HARQ-ACK codebook CB11 and the second HARQ-ACK codebook CB12.

In some embodiments, before obtaining the combined HARQ-ACK codebook CB13, UE 101 may perform a HARQ-ACK bundling operation by means of logic AND operation for the first HARQ-ACK codebook CB11 based on a bundle size to generate one or more bundled HARQ-ACK bits. The bundle size may be preconfigured by high layer signaling or predefined in specification. Alternatively, the number of the bundled HARQ-ACK bits may be preconfigured by high layer signaling or predefined in specification. The first sub-codebook includes the one or more bundled HARQ-ACK bits for the first PDSCH group PG11. In some embodiments, the first sub-codebook and the second sub-codebook are encoded separately. In some embodiments, the first sub-codebook and the second sub-codebook are concatenated for joint encoding.

For example, assuming two bits are used as group index. The group index may be selected from one of {0, 1, 2, 3}. When BS 102 determines to request UE 101 to retransmit the HARQ-ACK feedback for the first PDSCH group PG11 and the group index G11 indicated to the first PDSCH group PG11 is "0", BS 102 then selects the group index "0" same to the group index G11 and indicates this group index to the second. PDSCH group PG12.

Next, BS 102 transmits the second PDSCH group PG12 to UE 101.

Accordingly, when UE 101 receives the second PDSCH group PG12, UE 101 determines to retransmit HARQ-ACK feedback for the first PDSCH group PG11 since the group index "0" which is associated with the first PDSCH group PG11 is indicated again to the second PDSCH group PG12. UE 101 then obtains the combined HARQ-ACK codebook CB13 for the first PDSCH group PG1.1 and the second PDSCH group PG12 and transmits the combined HARQ-ACK, codebook CB13 to BS 102.

In some embodiments, when BS 102 receives and decodes the combined HARQ-ACK codebook CB13 successfully, BS 102 may indicate UE 101 to clear the first HARQ-ACK codebook CB11, which is included in the combined HARQ-ACK codebook CB13, from the buffer of UE 101. Subsequently, UE 101 may clear the first HARQ-ACK codebook CB11 from the buffer.

In some embodiments, each downlink transmission of the second PDSCH group PG12 is associated with one DCI scheduling the corresponding downlink transmission. In these embodiments, at least one DCI associated with one downlink transmission includes an indicator. The indicator may be used for indicating the second. HARQ-ACK codebook CB12 for the second PDSCH group PG12 to be suspended. This indicator may be an invalid PDSCH-to-HARQ timing indicator or PUCCH resource indicator or a dedicated bit field, preconfigured by high layer signaling. This indicator may be sent to UE 101 when BS 102 schedules new PDSCHs in the second PDSCH group PG12 to LIE 101 before BS 102 finishes the decoding of the first HARQ-ACK codebook CBI for the first PDSCH group PG11. After finishing the decoding of the first HARQ-ACK codebook CB11, BS 102 may indicate another indicator in at least one DCI scheduling one downlink transmission in the second PDSCH group PG12 to trigger UE 101 to transmit the second HARQ-ACK codebook CB12 for the second PDSCH group PG12 in response to BS 102 has successfully decoded the first HARQ-ACK codebook CB11, or the combined HARQ-ACK codebook of CB11 and CB12 in response to BS 102 has not successfully decoded the first HARQ-ACK codebook CB11. The another indicator may be a valid PDSCH-to-HARQ timing indicator or PUCCH resource indicator or a dedicated bit field, preconfigured by high layer signaling.

In some embodiments, when BS 102 determines to request UE 101 to retransmit HARQ-ACK feedback for the first PDSCH group PG11, BS 102 indicates the group index G11 to at least one downlink transmission of the second PDSCH group PG12. Accordingly, after receiving the at least one downlink transmission of the second PDSCH group PG12, UE 101 may retransmit HARQ-ACK feedback for the first PDSCH group PG11.

In some embodiments, when BS 102 determines not to request UE 101 to retransmit HARQ-ACK feedback for the first PDSCH group PG11, BS 102 does not indicate the group index G11 to any downlink transmission of the second PDSCH group PG12. Accordingly, after receiving the all downlink transmissions of the second PDSCH group PG12, the user equipment 13 may not retransmit HARQ-ACK feedback for the first PDSCH group PG11.

Figure 4A:
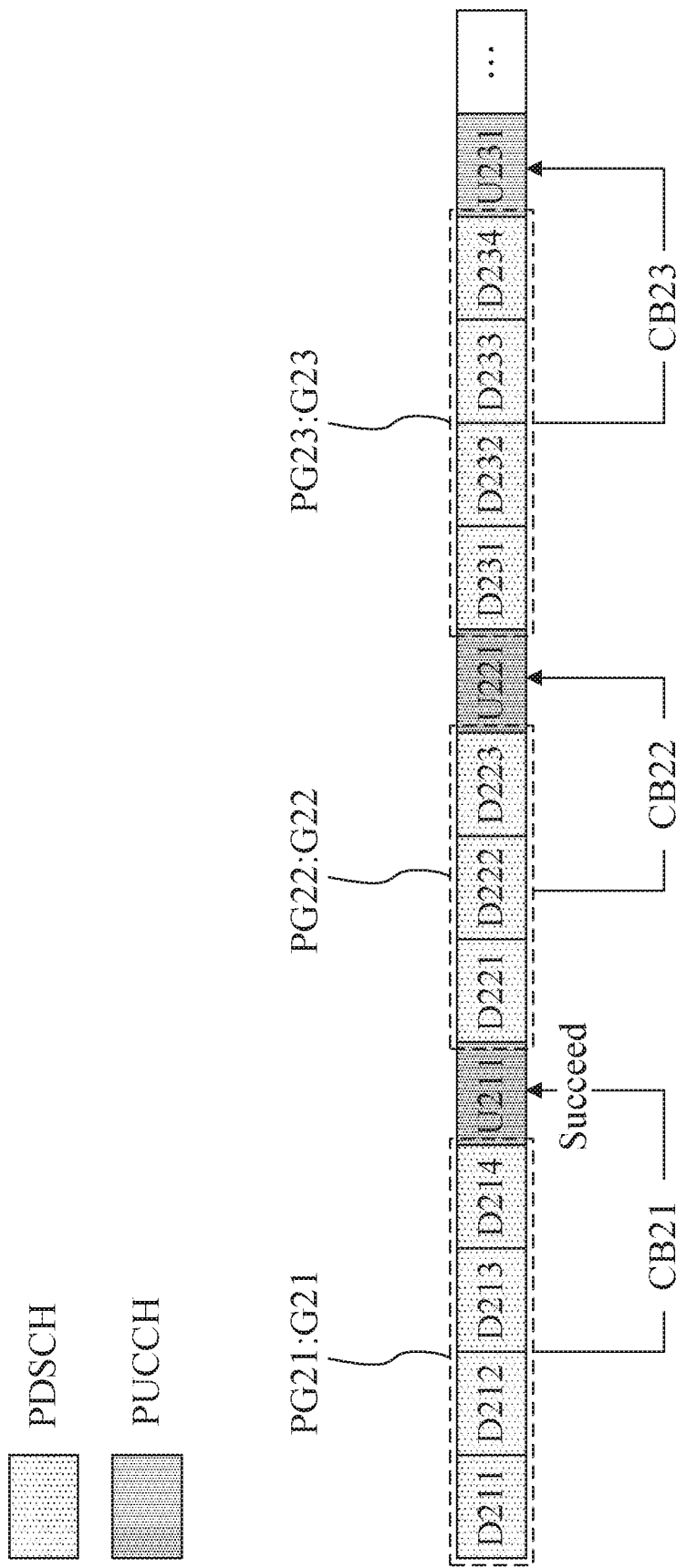
FIGS. 4A and 4B are schematic views of HARQ-ACK codebook transmission between a user equipment and a base station according to an embodiment of the present disclosure.
Figure 4B:
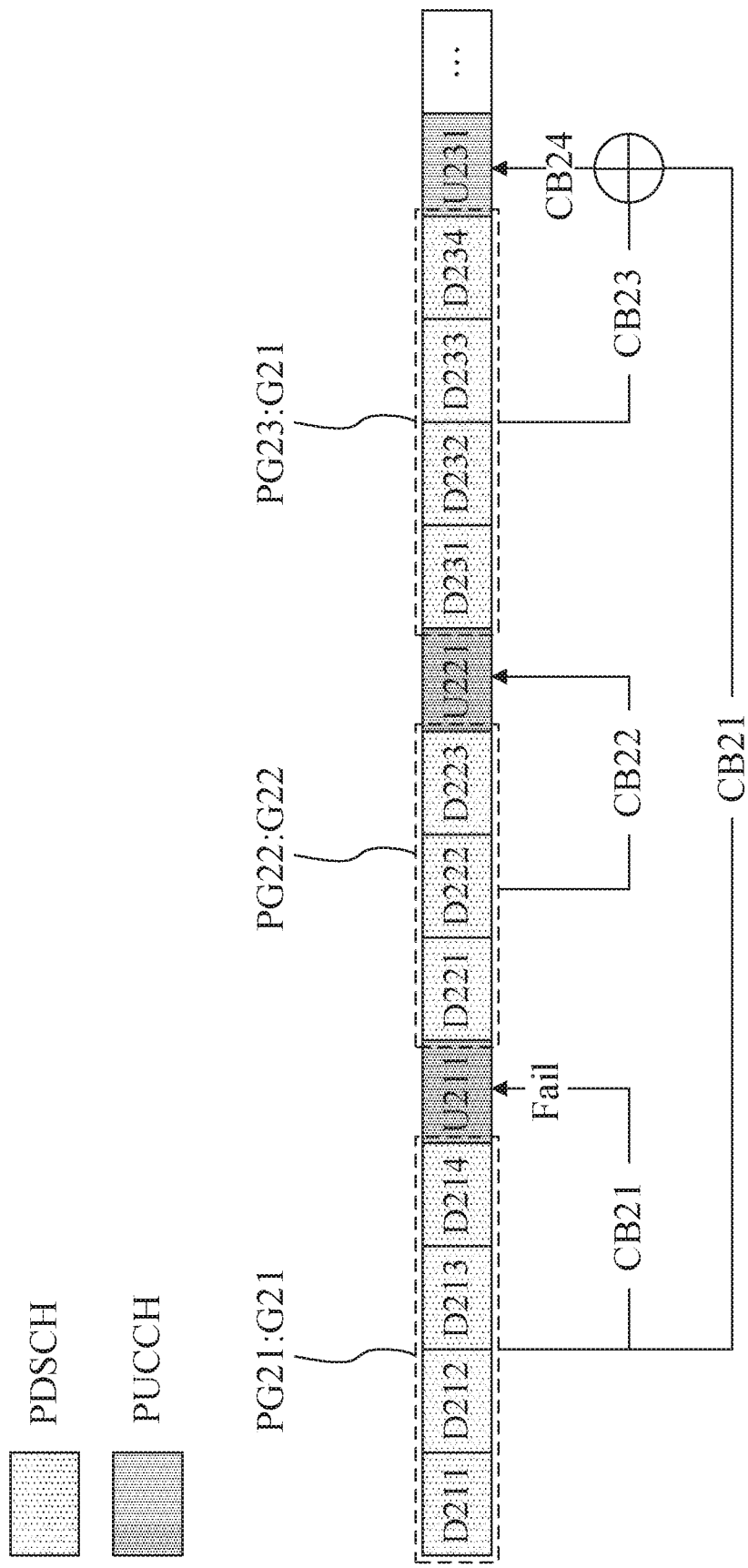

FIG. 4A to FIG. 4B are schematic views of HARQ-ACK codebook transmission between UE 101 and BS 102 according to some embodiments of the present disclosure. In these embodiments, group index may be introduced for triggering signaling to UE 101 for retransmission of HARQ-ACK feedback.

In some embodiments, BS 102 transmits a first PDSCH group PG21 of PDSCHs to IT, 101 via downlink transmissions D211 to D214. Each PDSCH of the first PDSCH group PG21 may be associated with a same group index G21 and the group index G21 may be included in DCI scheduling the associated PDSCH. In other words, the PDSCHs associated with the same group index G21 may be grouped in the same PDSCH group PG21. In some embodiments, value of group index may be cyclically incremented from one group to a next group.

After receiving the first PDSCH group PG21, UE 101 may generate HARQ-ACK feedback for the first PDSCH group PG21 and obtain a first HARQ-ACK codebook CB21. Then, UE 101 transmits the first HARQ-ACK codebook. CB21 to BS 102 in response to channel access procedure for transmitting the first HARQ-ACK codebook CB21 being successful.

BS 102 receives the first HARQ-ACK codebook CB21 and determines whether to request UE 101 to retransmit HARQ-ACK feedback for the first PDSCH group PG21. In these embodiments, considering the processing capability of BS 102, BS 102 may not finish the receiving and the decoding of the first HARQ-ACK codebook CB21 before transmitting a second PDSCH group PG22 to UE 101. Therefore, the second PDSCH group PG22 may be indicated to a group index G22 and be transmitted to UE 101 first. During the transmission of the second PDSCH group PG22, BS 102 may finish the decoding of the first HARQ-ACK codebook CB21 and determine whether to request UE 101 to retransmit HARQ-ACK feedback for the first PDSCH group PG21.

Please refer to FIG. 4A. In detail, in some embodiments, when BS 102 receives a PUCCH carrying the first HARQ-ACK codebook CB21 for the first PDSCH group PG21 via an uplink transmission U211 and decodes the first HARQ-ACK codebook CB21 successfully during the transmission of the second PDSCH group PG22, BS 102 may determine not to request UE 101 to retransmit the HARQ-ACK feedback for the first PDSCH group PG21.

More specifically, when BS 102 determines not to request. UE 101 to retransmit the HARQ-ACK feedback for the first PDSCH group PG21, BS 102 may indicate a group index G23, which is different from the group index G21 associated with the first PDSCH group PG21, to a third PDSCH group PG23 of PDSCHs. In these embodiments, the group index G21, the group index G22 and the group index G23 are accumulated in order. Then, BS 102 may transmit the third PDSCH group PG23 to LIE 101 via downlink transmission D231 to D234 after receiving a second HARQ-ACK codebook CB22, which is carried in a PUCCH via an uplink transmission U231, for the second PDSCH group PG22.

When UE 101 receives the third PDSCH group PG23, UE 101 may determine whether to retransmit HARQ-ACK feedback for the first PDSCH group PG21 according to the group index associated with the third PDSCH group PG23. In particular, because the BS 102 indicates the group index G23 to the third PDSCH group PG23 and the group index G23 is different from the group index G21 associated with the first PDSCH group PG21, UE 101 determines not to retransmit HARQ-ACK feedback for the first PDSCH group PG21 accordingly.

Next, UE 101 obtains a third HARQ-ACK codebook CB23 for the third PDSCH group PG23 in response to determining not to retransmit HARQ-ACK feedback for the first PDSCH group PG21, and then UE 101 transmits the third HARQ-ACK codebook CB23 to BS 102 in a PUCCH via an uplink transmission U231. Subsequently, BS 102 receives the third HARQ-ACK codebook CB23 from UE 101.

For example, assuming two bits are used as group index. The group index may be selected from one of {0, 1, 2, 3}. When the group index of the first PDSCH group PG21 is indicated to "0" and BS 102 cannot finish the receiving and the decoding of the first HARQ-ACK codebook CB21 before transmitting the second PDSCH group PG22 to UE 101, BS 102 selects the next group index "1" according to the order of {0, 1, 2, 3} and indicate the group index "1" to the second PDSCH group PG22 before transmitting the second PDSCH group PG22 to UE 101.

Then, during the transmission of the second PDSCH group PG22, BS 102 receives and decodes the first HARQ-ACK codebook CB21 successfully. Therefore, BS 102 determines not to request UE 101 to retransmit HARQ-ACK feedback for the first PDSCH group PG21. BS 102 then selects the group index "2" according to the order of {0, 1, 2, 3} and indicate the group index "2" to the third PDSCH group PG23.

Next, BS 102 transmits the third PDSCH group PG23 to UE 101. Accordingly, when UE 101 receives the third PDSCH group PG23, UE 101 determines not to retransmit HARQ-ACK feedback for the first PDSCH group PG21 since the group index "2" of the third PDSCH group PG23 is different from the value "0" of the group index G21 of the first PDSCH group PG11.

In some embodiments, when UE 101 receives and decodes the first HARQ-ACK codebook CB21 successfully, BS 102 may indicate UE 101 to clear the first HARQ-ACK codebook CB21 from the buffer. Subsequently, UE 101 may clear the first HARQ-ACK codebook CB21 from the buffer.

Please refer to FIG. 4B. On the other hand, in some embodiments, when BS 102 fails to receive or decode the first HARQ-ACK codebook CB21 carried in the corresponding PUCCH during the transmission of the second PDSCH group PG22, BS 102 may determine to request UE 101 to retransmit the HARQ-ACK feedback for the first PDSCH group PG21.

More specifically, in these embodiments, when BS 102 determines to request UE 101 to retransmit the HARQ-ACK feedback for the first PDSCH group PG21, BS 102 may indicate the group index G21 of the first PDSCH group PG21 to the third PDSCH group PG23 and transmits the third PDSCH group PG23 to UE 101 via downlink transmissions D231 to D234.

When UE 101 receives the third PDSCH group PG23, UE 101 may determine whether to retransmit HARQ-ACK feedback for the first PDSCH group PG21 according to the group index of the third PDSCH group PG23. In particular, because BS 102 indicates the group index G21 to the third PDSCH group PG23 and the group index G21 has been indicated to the first PDSCH group PG21, UE 101 may determine to retransmit HARQ-ACK feedback for the first PDSCH group PG21 accordingly.

Next, UE 101 obtains a combined HARQ-ACK codebook CB24 for the first PDSCH group PG21 and the third PDSCH group PG23 in response to determining to retransmit HARQ-ACK feedback for the first PDSCH group PG21, and then UE 101 transmits the combined HARQ-ACK codebook CB24 to BS 102 in the corresponding PUCCH via the uplink transmission U231. Subsequently, BS 102 receives the combined HARQ-ACK codebook CB24 from LIE 101. In some embodiments, the combined HARQ-ACK codebook CB24 includes a first sub-codebook corresponding to the first PDSCH group PG21 and a second sub-codebook corresponding to the third PDSCH group PG23. In other words, the combined HARQ-ACK codebook. CB24 includes the first HARQ-ACK codebook CB21 and the third HARQ-ACK codebook CB23.

In some embodiments, before obtaining the combined HARQ-ACK codebook CB24, LIE 101 may perform a HARQ-ACK bundling operation by means of logic AND operation for the first HARQ-ACK codebook CB21 based on a bundle size to generate one or more bundled HARQ-ACK bits. The bundle size may be preconfigured by high layer signaling or predefined in specification. Alternatively, the number of the bundled HARQ-ACK bits may be preconfigured by high layer signaling or predefined in specification. The first sub-codebook includes the one or more bundled HARQ-ACK bits for the first PDSCH group PG21. In some embodiments, the first sub-codebook and the second sub-codebook are encoded separately. In some embodiments, the first sub-codebook and the second sub-codebook are concatenated for joint encoding.

For example, assuming two bits are used as group index. The group index may be selected from one of {0, 1, 2, 3}. When the group index of the first PDSCH group PG21 is indicated to "0" and BS 102 cannot finish the receiving and the decoding of the first HARQ-ACK codebook CB21 before transmitting the second PDSCH group PG22 to UE 101, BS 102 selects the group index "1" according to the order of {0, 1, 2, 3} and indicates the group index "1" to the second PDSCH group PG22 before transmitting the second PDSCH group PG22 to UE 101.

Then, during the transmission of the second PDSCH group PG22, BS 102 fails to receive or decode the first HARQ-ACK codebook CB21. Therefore, BS 102 determines to request UE 101 to retransmit the HARQ-ACK feedback for the first PDSCH group PG21. BS then selects the group index "0" of the first PDSCH group PG21, and indicates the group index "0" to the third PDSCH group PG23.

Next, BS 102 transmits the third PDSCH group PG23 to UE 101. Accordingly, when UE 101 receives the third PDSCH group PG23, UE 101 determines to retransmit HARQ-ACK feedback for the first PDSCH group PG21 since the group index "0" which is associated with the first PDSCH group PG21 is indicated again to the third PDSCH group PG23 UE 101 then obtains the combined HARQ-ACK codebook CB24 for the first PDSCH group PG21 and the third PDSCH group PG23 and transmits the combined HARQ-ACK codebook CB24 to BS 102.

In some embodiments, when BS 102 receives and decodes the combined HARQ-ACK codebook CB24 successfully, BS 102 may indicate UE 101 to clear the first HARQ-ACK codebook CB21, which is included in the combined HARQ-ACK codebook CB24, from the buffer.

Subsequently, UE 101 may clear the first HARQ-ACK codebook CB21 from the buffer.

In some embodiments, each downlink transmission of the second PDSCH group PG22 is associated with one DCI scheduling the corresponding downlink transmission. In these embodiments, at least one DCI associated with one downlink transmission includes an indicator. The indicator may be used for indicating the second HARQ-ACK codebook CB22 for the second PDSCH group PG22 to be suspended. This indicator may be an invalid PDSCH-to-HARQ timing indicator or PUCCH resource indicator or a dedicated bit field, preconfigured by high layer signaling. This indicator may be sent to UE 101 when BS 102 schedules new PDSCHs in the second PDSCH group PG22 to UE 101 before BS 102 finishes the decoding of the first HARQ-ACK codebook CB21 for the first PDSCH group PG21. After finishing the decoding of the first HARQ-ACK codebook CB21, BS 102 may indicate another indicator in at least one DCI scheduling one downlink transmission in the second PDSCH group PG22 to trigger UE 101 to transmit the second HARQ-ACK codebook CB22 for the second PDSCH group PG22 in response to BS 102 has successfully decoded the first HARQ-ACK codebook CB21, or the combined HARQ-ACK codebook of CB21 and CB22 in response to BS 102 has not successfully decoded the first HARQ-ACK codebook CB21. The another indicator may be a valid PDSCH-to-HARQ timing indicator or PUCCH resource indicator or a dedicated bit field, preconfigured by high layer signaling.

In some embodiments, when BS 102 determines to request UE 101 to retransmit HARQ-ACK feedback for the first PDSCH group PG21, BS 102 indicates the group index G21 to at least one downlink transmission of the third PDSCH group PG23. Accordingly, after receiving the at least one downlink transmission of the third PDSCH group PG23, UE 101 may retransmit HARQ-ACK feedback for the first PDSCH group PG21.

In some embodiments, when BS 102 determines not to request UE 101 to retransmit HARQ-ACK, feedback for the first PDSCH group PG21, BS 102 does not indicate the group index G21 to any downlink transmission of the third PDSCH group PG23. Accordingly, after receiving the all downlink transmissions of the third PDSCH group PG23, the user equipment 23 may not retransmit HARQ-ACK feedback for the first PDSCH group PG21.

Figure 5A:
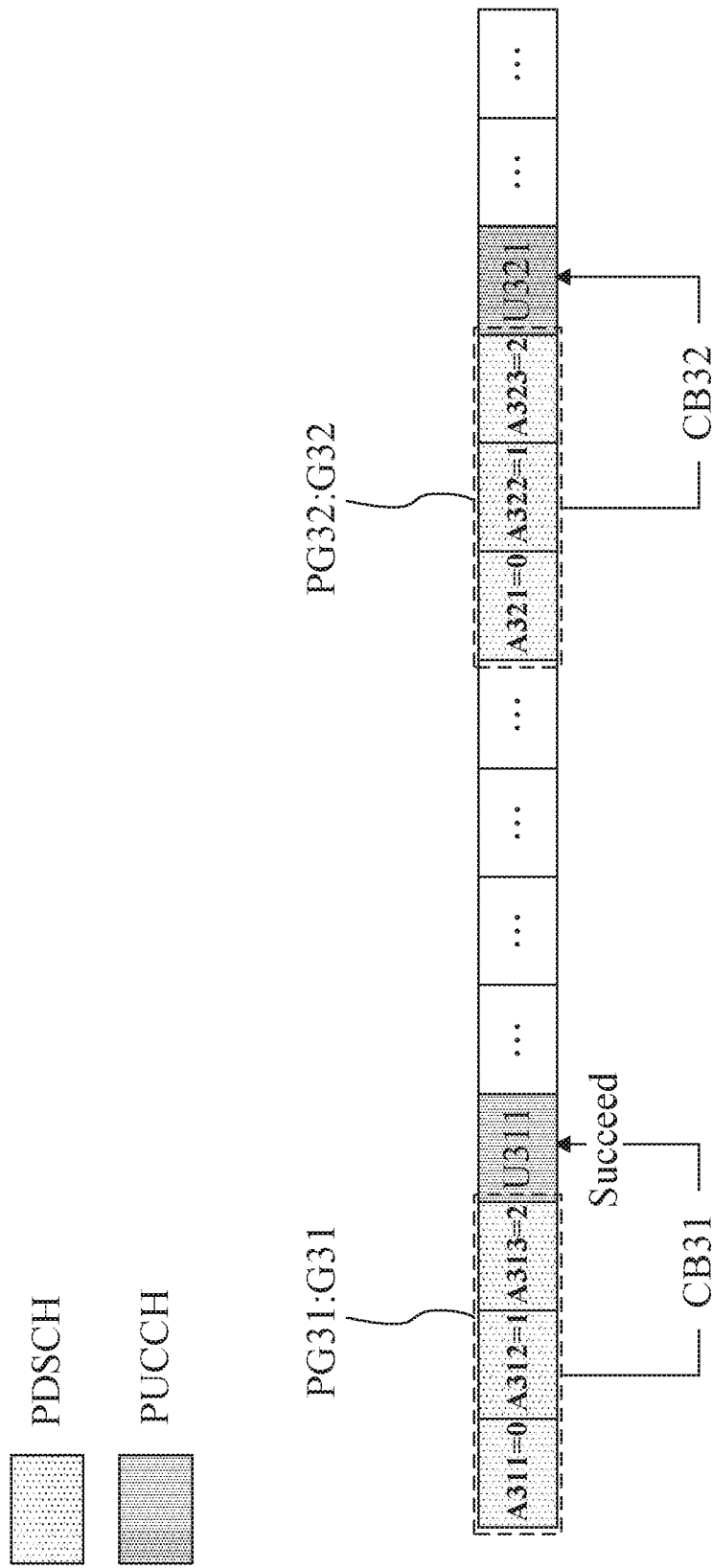
FIGS. 5A and 5B are schematic views of HARQ-ACK codebook transmission between a user equipment and a base station according to an embodiment of the present disclosure.
Figure 5B:
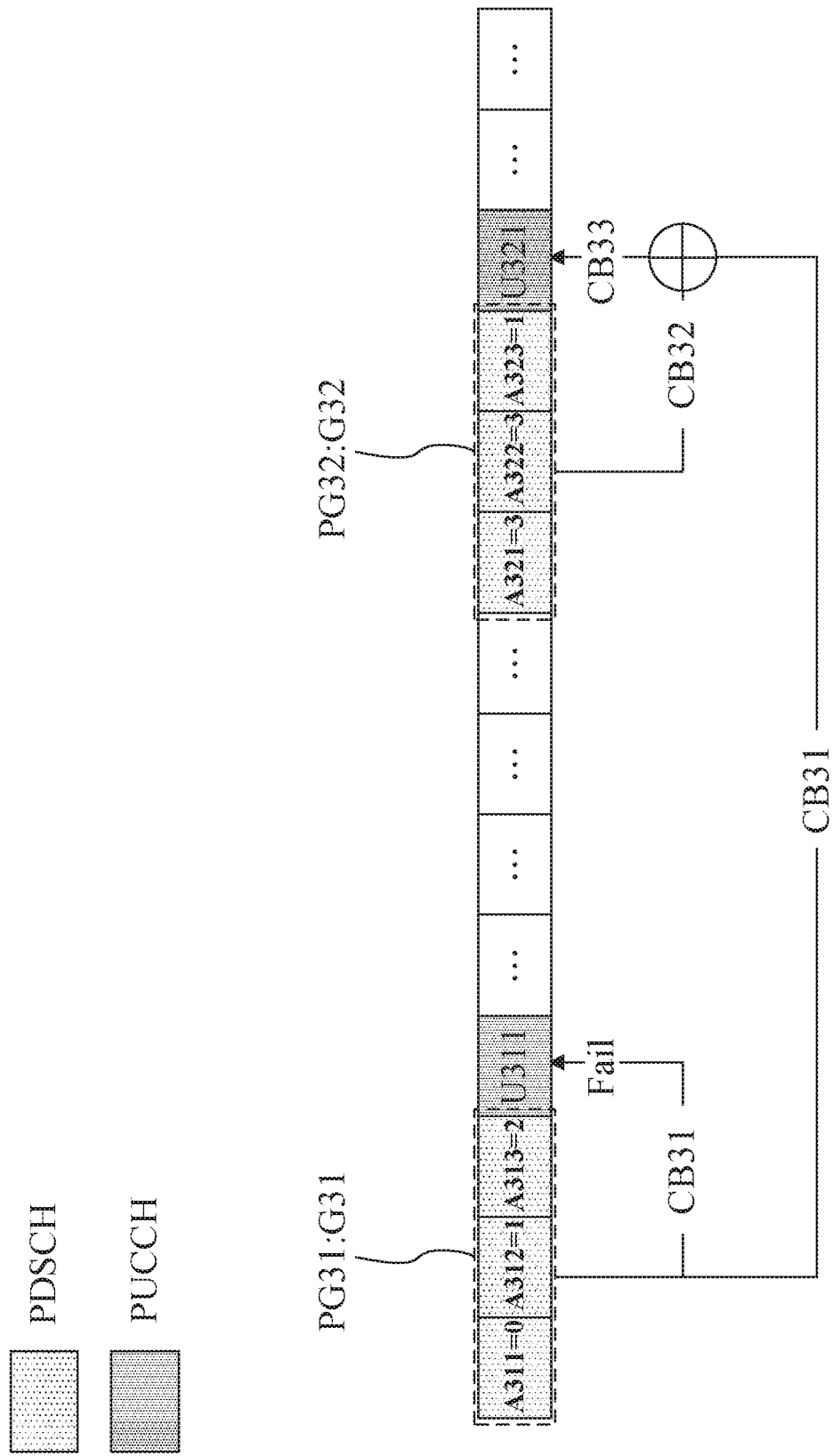

FIG. 5A to FIG. 5B are schematic views of HARQ-ACK codebook transmission between UE 101 and BS 102 according to some embodiments of the present disclosure. In these embodiments, a counter-based Downlink Assignment Index (DAI) may be introduced for triggering signaling to UE 101 for retransmission of HARQ-ACK feedback.

In some embodiments, BS 102 transmits a first PDSCH group PG31 of PDSCHs to UE 101. Each PDSCH of the first PDSCH group PG31 may be associated with a same group index G31 and the group index G31 may be included in DCI scheduling the associated PDSCH. In other words, the PDSCHs associated with the same group index G31 may be grouped in the same PDSCH group PG31.

In addition, in some embodiments, the PDSCHs of the first PDSCH group PG31 may be indicated to DAIs A311 to A313 respectively. Each DAI may be included in the corresponding DCI as well. In some embodiments, DAI may be accumulated within one PDSCH group. In other words, the DAIs A311 to A313 associated with the PDSCHs of the first PDSCH group PG31 may be in sequence within the first PDSCH group PG31. In some embodiments, DAI may be accumulated from one PDSCH group to a next PDSCH group. In other words, the DAIs A311 to A313 associated with the PDSCHs of the first PDSCH group PG31 may be accumulated from the first PDSCH group PG31 to a next group.

For example, assuming two bits are used as DAI, DAI is using modulo operation by four. The order of the DAI may be {0, 1, 2, 3}. DAIs of PDSCHs of one PDSCH group are indicated from minimum value "0" to maximum value "3" respectively and cyclically. In these embodiments, the DAIs A311 to A313 of the PDSCHs of the first PDSCH group PG31 are indicated to "0" to "2". Alternatively, the order of the DAI may be {1, 2, 3, 4}. DAIs of PDSCHs of one PDSCH group are indicated from minimum value "1" to maximum value "4" respectively and cyclically. For simplicity, group index value of {0, 1, 2, 3} is used as an example in the following, which does not exclude the usage of group index value of {1, 2, 3, 4}. In these embodiments, the DAIs A311 to A313 of the PDSCHs of the first PDSCH group PG31 are indicated to "0" to "2".

After receiving the first PDSCH group PG31, UE 101 may generate HARQ-ACK feedback for the first PDSCH group PG31 and obtain a first HARQ-ACK codebook CB31. Then, UE 101 transmits the first HARQ-ACK codebook CB31 to BS 102 in response to channel access procedure for transmitting the first HARQ-ACK codebook CB31 being successful.

Please refer to FIG. 5A. In detail, in some embodiments, when BS 102 receives a PUCCH carrying the first HARQ-ACK codebook CB31 for the first PDSCH group PG31 via an uplink transmission U311 and decodes the first codebook CB31 successfully, BS 102 may determine not to request UE 101 to retransmit the HARQ-ACK feedback for the first PDSCH group PG31.

More specifically, in these embodiments, when BS 102 determines not to request UE 101 to retransmit the HARQ-ACK feedback for the first PDSCH group PG31, BS 102 may indicate DAIs A321 to A323 to PDSCHs of a second PDSCH group PG32 from the minimum value of possible DAIS to maximum value of possible DAIs respectively and cyclically. BS 102 then transmits the second PDSCH group PG32 to UE 101. In some embodiments, there may be at least one PDSCH group being transmitted between the transmission of the first PDSCH group PG31 and the transmission of the second PDSCH group PG32 and BS 102 may receive and decode first HARQ-ACK codebook CB31 successfully during the transmission of the at least one PDSCH group.

When LIE 101 receives the second PDSCH group PG32, UE 101 may determine whether to retransmit HARQ-ACK feedback for the first PDSCH group PG31 according to the DAIs A321 to A323 of the PDSCHs of the second PDSCH group PG32. In particular, because the DAIs A321 to A323 of the PDSCHs of the second PDSCH group PG32 are indicated from the minimum value of possible DAIs to maximum value of possible DAIs respectively and cyclically, UE 101 may determine not to retransmit the HARQ-ACK feedback for the first PDSCH group PG31 accordingly. In other words, when the DAI A321 of a first PDSCH of the second PDSCH group PG32 is the minimum value of possible DAIs, LE 101 may determine not to retransmit the HARQ-ACK feedback for the first PDSCH group PG31.

Next, UE 101 obtains a second HARQ-ACK codebook CB32 for the second PDSCH group PG32 in response to determining not to retransmit HARQ-ACK feedback for the first PDSCH group PG31, and then UE 101 transmits the second codebook CB32 to BS 102 in a PUCCH via an uplink transmission U321. Subsequently, BS 102 receives the second HARQ-ACK codebook CB32 from UE 101.

Please refer to FIG. 5A further. For example, assuming two bits are used as DAT and number of PDSCHs of the first PDSCH group PG31 is three, the possible DAIs are 10, 1, 2, 31 and the DAIs are indicated to the PDSCHs of the first PDSCH group PG31 from minimum value "0" to value "2". As shown in FIG. 5A, the first PDSCH of the first PDSCH group PG31 is associated with the DAT A311 which is indicated to the minimum value "0" of possible DAIs, the second PDSCH of the first PDSCH group PG31 is associated with the DAT A312 which is indicated to next value "1" of possible DAIS, and the third PDSCH of the first PDSCH group PG31 is associated with the DAT A313 which is indicated to next value "2" of possible DAIs.

When BS 102 determines not to request UE 101 to retransmit the HARQ-ACK feedback for the first PDSCH group PG31, BS 102 indicates DAIs to the PDSCHs of the second PDSCH group PG32 from the minimum value "0" of possible DAIs. As shown in FIG. 5A, the first PDSCH of the second PDSCH group PG32 is associated with the DAT A321 which is indicated to the minimum value "0" of possible DAIs. Similarly, the second. PDSCH of the second PDSCH group PG32 is associated with the DAI A322 which is indicated to next value "1" of possible DAIs, and the third PDSCH of the second PDSCH group PG32 is associated with the DAT A323 which is indicated to next value "2" of possible DAIs.

Next, BS 102 transmits the second PDSCH group PG32 to UE 101.

Accordingly, when UE 101 receives the second PDSCH group PG32, UE 101 determines not to retransmit HARQ-ACK feedback for the first PDSCH group PG31 since the value "0" of the DAI A321 of the first PDSCH of the second PDSCH group PG32 is the minimum value of the possible DAIS.

In some embodiments, when BS 102 receives and decodes the first HARQ-ACK codebook CB31 successfully, BS 102 may indicate UE 101 to clear the first HARQ-ACK codebook CB31 from the buffer. Subsequently, UE 101 may clear the first HARQ-ACK codebook CB31 from the buffer.

Please refer to FIG. 5B. On the other hand, in some embodiments, when BS 102 fails to receive or decode the first HARQ-ACK codebook CB31 carried in the corresponding PUCCH, BS 102 may determine to request UE 101 to retransmit the HARQ-ACK feedback or the first PDSCH group PG31.

More specifically, when BS 102 determines to request UE 101 to retransmit the HARQ-ACK feedback for the first PDSCH group PG31, BS 102 indicates the DAIs A321 to A323 to the PDSCHs of the second PDSCH group PG32 from the value that follows the DAI A313 of the last PDSCH of the first PDSCH group PG31. In other words, BS 102 indicates the DAL A321 to the first PDSCH of the second PDSCH group G32 from the value that follows the DAI A313 of the last PDSCH of the first PDSCH group PG31. BS 102 then transmits the second PDSCH group PG32 to UE 101.

When UE 101 receives the second PDSCH group PG32, UE 101 may determine whether to retransmit HARQ-ACK feedback for the first PDSCH group PG31 according to the DAIs A321 to A323 of the PDSCHs of the second PDSCH group PG32. In particular, because BS 102 indicates the DAI A321 to the first PDSCH of the second PDSCH group G32 from the value that follows the DAI A313 of the last PDSCH of the first PDSCH group PG31, UE 101 determines to retransmit HARQ-ACK feedback for the first PDSCH group PG31 accordingly.

Next, UE 101 obtains a combined HARQ-ACK codebook CB33 for the first PDSCH group PG31 and the second PDSCH group PG32 in response to determining to retransmit HARQ-ACK feedback for the first PDSCH group PG31. Then, UE 101 transmits the combined HARQ-ACK codebook CB33 to BS 102 in the corresponding PUCCH via the uplink transmission U321. Subsequently, BS 102 receives the combined HARQ-ACK codebook CB33 from UE 101. In some embodiments, the combined HARQ-ACK codebook CB33 includes a first sub-codebook corresponding to the first PDSCH group PG31 and a second sub-codebook corresponding to the second PDSCH group PG32. In other words, the combined HARQ-ACK codebook CB33 includes the first HARQ-ACK codebook CB31 and the second HARQ-ACK codebook CB32.

In some embodiments, before obtaining the combined HARQ-ACK codebook. CB33, UE 101 may perform a HARQ-ACK bundling operation by means of logic AND operation for the first HARQ-ACK codebook CB31 based on a bundle size to generate one or more bundled HARQ-ACK bits. The bundle size may be preconfigured by high layer signaling or predefined in specification. Alternatively, the number of the bundled HARQ-ACK hits may be preconfigured by high layer signaling or predefined in specification. The first sub-codebook includes the one or more bundled HARQ-ACK bits for the first PDSCH group PG31. In some embodiments, the first sub-codebook and the second sub-codebook are encoded separately. In some embodiments, the first sub-codebook and the second sub-codebook are concatenated for joint encoding.

Please refer to FIG. 5B further. For example, when BS 102 determines to request UE 101 to retransmit the HARQ-ACK feedback for the first PDSCH group PG31, BS 102 indicates a DAI value which follows the last PDSCH of the first PDSCH group PG31 to the first PDSCH of the second PDSCH group PG32. As shown in FIG. 5B, BS 102 indicates value "3", which follows value "2" of the DAI 313 of the last PDSCH of the first PDSCH group PG31, to the first PDSCH of the second PDSCH group PG32.

Next, BS 102 transmits the second PDSCH group PG32 to UE 101. Accordingly, when UE 101 receives the second PDSCH group PG32, UE 101 determines to retransmit HARQ-ACK feedback for the first PDSCH group PG31 since the value "3" of the DAI A321 of the first PDSCH of the second PDSCH group PG32 follows the value "2" of the DAI A313 associated with the last PDSCH of the first PDSCH group PG31. UE 101 then obtains the combined HARQ-ACK codebook CB33 for the first PDSCH group PG31 and the second PDSCH group PG32 and transmits the combined HARQ-ACK codebook CB33 to BS 102.

In some embodiments, when BS 102 receives and decodes the combined HARQ-ACK codebook CB33 successfully, BS 102 may indicate UE 101 to clear the first HARQ-ACK codebook CB31, which is included in the combined. HARQ-ACK codebook CB33, from the buffer. Subsequently, UE 101 may clear the first HARQ-ACK codebook CB31 from the buffer.

In some embodiments, each downlink transmission of the second PDSCH group PG32 is associated with one DCI scheduling the corresponding downlink transmission. In these embodiments, at least one DCI associated with one downlink transmission includes an indicator. The indicator may be used for indicating the second HARQ-ACK codebook CB32 for the second PDSCH group PG32 of downlink transmissions to be suspended. This indicator may be an invalid PDSCH-to-HARQ timing indicator or PUCCH resource indicator or a dedicated bit field, preconfigured by high layer signaling. This indicator may be sent to UE 101 when BS 102 schedules new PDSCHs in the second PDSCH group PG32 to UE 101 before BS 102 finishes the decoding of the first HARQ-ACK codebook CB31 for the first PDSCH group PG31. After finishing the decoding of the first HARQ-ACK codebook CB31, BS 102 may indicate another indicator in at least one DCI scheduling one downlink transmission in the second PDSCH group PG32 to trigger UE 101 to transmit the second HARQ-ACK codebook CB32 for the second PDSCH group PG22 in response to BS 102 has successfully decoded the first HARQ-ACK codebook CB31, or the combined HARQ-ACK codebook of CB31 and CB32 in response to BS 102 has not successfully decoded the first HARQ-ACK codebook CB31. The another indicator may be a valid PDSCH-to-HARQ timing indicator or PUCCH resource indicator or a dedicated bit field, preconfigured by high layer signaling.

Figure 6A:
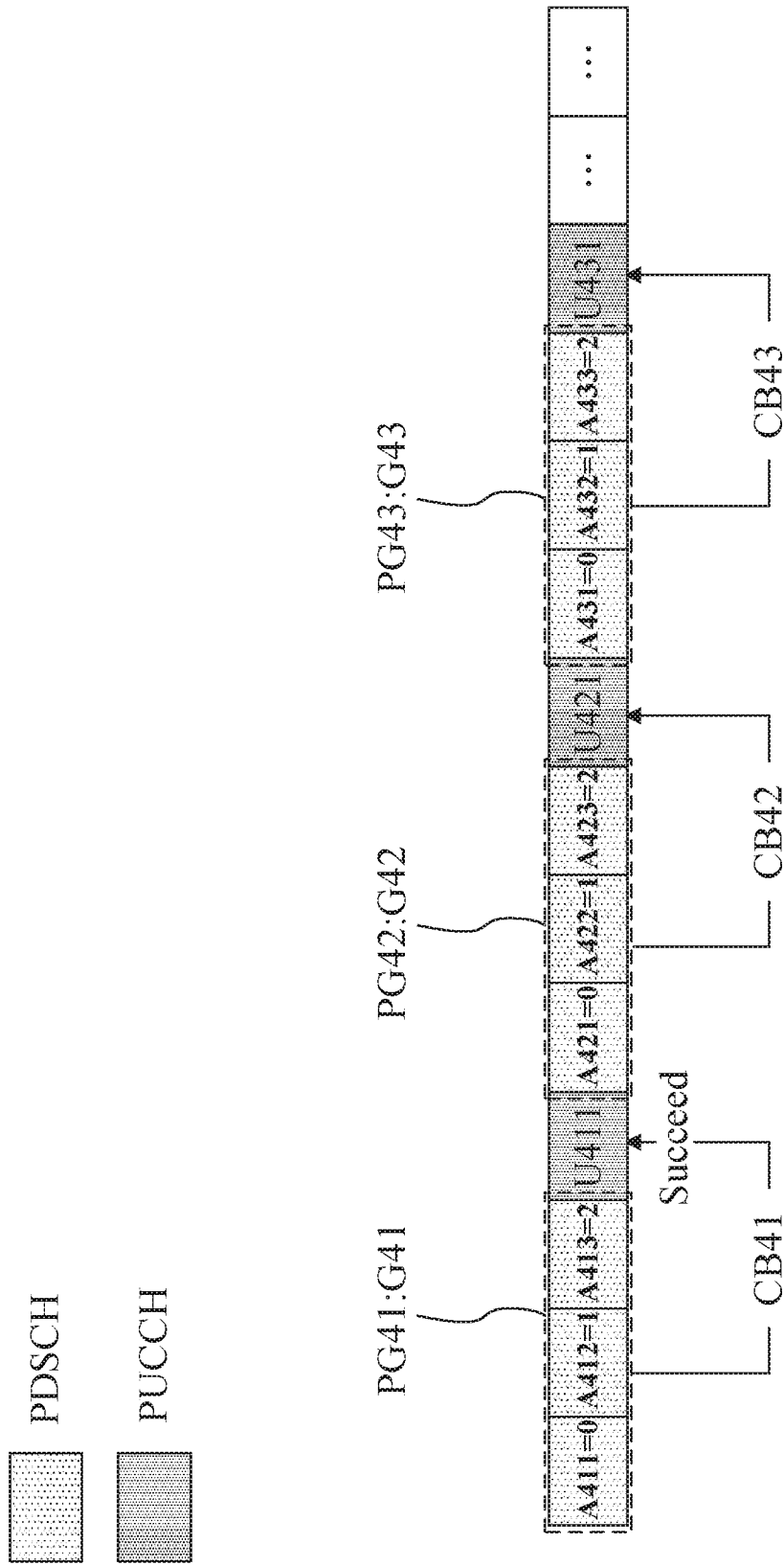
FIGS. 6A and 6B are schematic views of HARQ-ACK codebook transmission between a user equipment and a base station according to an embodiment of the present disclosure.
Figure 6B:
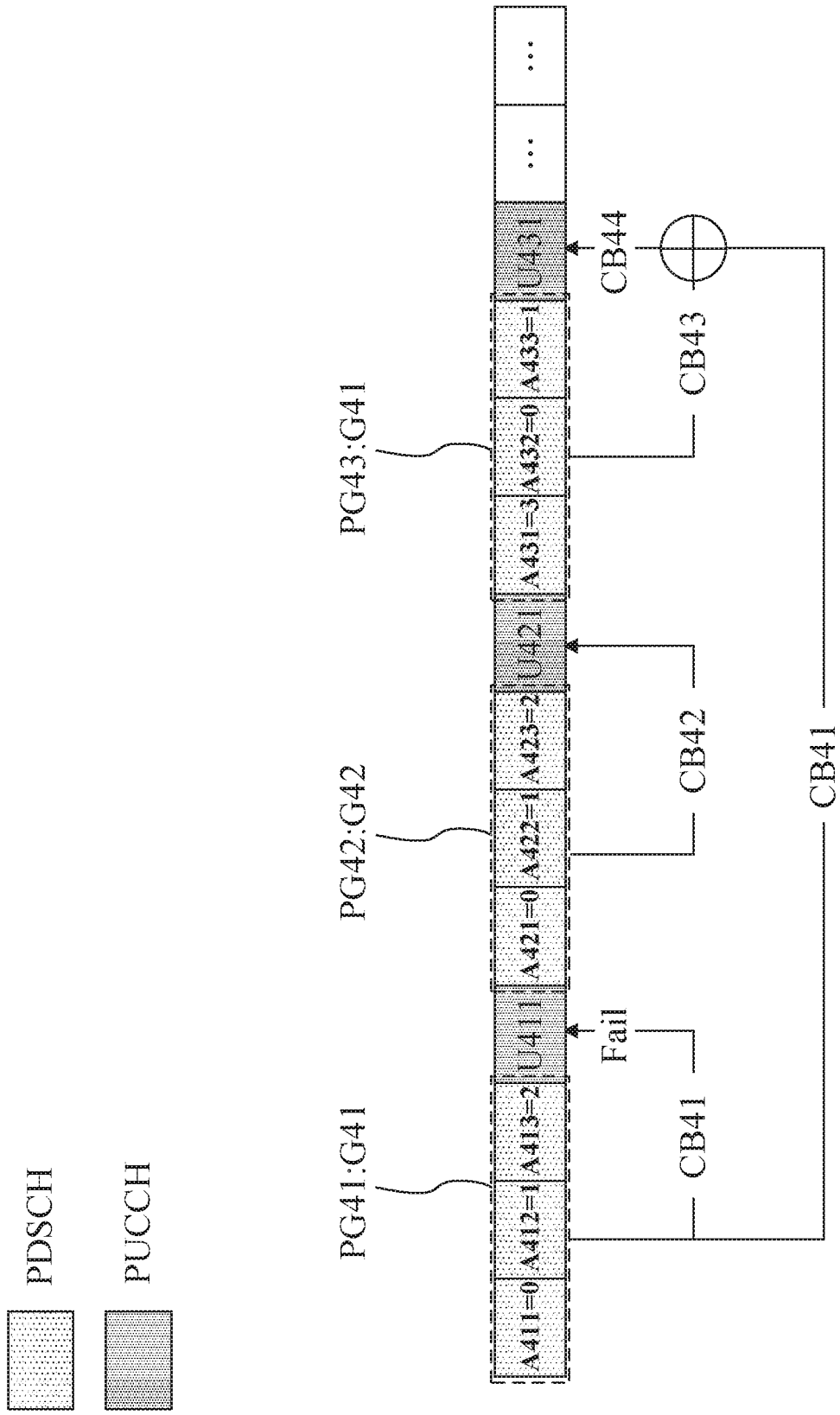

FIG. 6A to FIG. 6B are schematic views of HARQ-ACK codebook transmission between UE 101 and BS 102 according to some embodiments of the present disclosure. In these embodiments, a counter-based DAI may be introduced for triggering signaling to UE 101 for retransmission of HARQ-ACK feedback.

In some embodiments, BS 102 transmits a first PDSCH group PG41 of PDSCHs to UE 101. Each PDSCH of the first PDSCH group PG41 may be associated with a same group index G41 and the group index G41 may be included in DCI scheduling the associated PDSCH. In other words, the PDSCHs associated with the same group index G41 may be grouped in the same PDSCH group PG41.

In addition, in some embodiments, the PDSCHs of the first PDSCH group PG41 may be indicated to DAIs A411 to A413 respectively. Each DAI may be included in the corresponding DCI as well. In some embodiments, DAI may be accumulated within one PDSCH group. In other words, the DAIs A411 to A413 associated with the PDSCHs of the first PDSCH group PG41 may be in sequence within the first PDSCH group PG41. In some embodiments, DAI may be accumulated from one PDSCH group to a next PDSCH group. In other words, the DAIs A411 to A413 associated with the PDSCHs of the first PDSCH group PG41 may be accumulated from the first PDSCH group PG41 to a next group.

For example, assuming two bits are used as DAI, DAI is using modulo operation by four. The order of the values of DAI may be {0, 1, 2, 3}. DAIs of PDSCHs of one PDSCH group are indicated from minimum value "0" to "3" respectively and cyclically. In these embodiments, the DAIs A411 to A413 of the PDSCHs of the first PDSCH group PG31 are indicated to "0" to "2".

After receiving the first PDSCH group PG41, UE 101 may generate HARQ-ACK feedback for the first PDSCH group PG41 and obtain a first HARQ-ACK codebook CB41. Then, UE 101 transmits the first HARQ-ACK codebook CB41 to BS 102 in response to channel access procedure for transmitting the first HARQ-ACK codebook CB41 being successful.

BS 102 receives the first HARQ-ACK codebook CB41 and determines whether to request UE 101 to retransmit HARQ-ACK feedback for the first PDSCH group PG41. In these embodiments, considering the processing capability of BS 102, BS 102 may not finish the receiving and the decoding of the first HARQ-ACK codebook CB41 before transmitting a second PDSCH group PG42 to UE 101. Therefore, the second PDSCH group PG42 may be indicated to a group index G42 and transmitted to UE 101 first. In addition, DAIs A421 to A423 for PDSCHs of the second PDSCH group PG42 may be indicated from minimum value of possible DAIs. During the transmission of the second PDSCH group PG42, BS 102 may finish the decoding of the first HARQ-ACK codebook CB41 and determine whether to request UI 101 to retransmit HARQ-ACK feedback for the first PDSCH group PG41.

Please refer to FIG. 6A. In detail, in some embodiments, when BS 102 receives a PUCCH carrying the first HARQ-ACK codebook CB41 for the first PDSCH group PG41 via an uplink transmission U411 and decodes the first HARQ-ACK codebook CB41 successfully during the transmission of the second PDSCH group PG42, BS 102 may determine not to request UE 101 to retransmit the HARQ-ACK feedback for the first PDSCH group PG41.

More specifically, when BS 102 determines not to request UE 101 to retransmit the HARQ-ACK feedback for the first PDSCH group PG41, BS 102 indicates a group index G43 to the third PDSCH group PG43, and indicates values of possible DAIs to PDSCHs of the third PDSCH group PG43 from minimum value of possible DAIs to maximum value of possible DAIs respectively and cyclically. Then, BS 102 transmits the third PDSCH group PG43 to UE 101 after transmitting a second HARQ-ACK codebook CB42, which is carried in PUCCH via an uplink transmission U421, for the second PDSCH group PG42.

Accordingly, when UE 101 receives the third PDSCH group PG43, UE 101 may determine whether to retransmit HARQ-ACK feedback for the first PDSCH group PG41 according to the DAIs A431 to A433 of PDSCHs of the third PDSCH group PG43. In particular, because the DAIs A431 to A433 of the PDSCHs of the third. PDSCH group PG43 are indicated from the minimum value of possible DAIs to maximum value of possible DAIs respectively and cyclically, UE 101 may determine not does not retransmit the HARQ-ACK feedback for the first PDSCH group PG31. In other words, because the DAI A431 of a first PDSCH of the third PDSCH group PG43 is the minimum value of possible DAIs, UE 101 may determine not does not retransmit the HARQ-ACK feedback for the first PDSCH group PC 1.

Next, UE 101 Obtains a third HARQ-ACK codebook CB43 for the third PDSCH group PG43 in response to determining not to retransmit HARQ-ACK feedback for the first PDSCH group PG41, and then UE 101 transmits the third HARQ-ACK codebook CB43 to BS 102 in a PUCCH via an uplink transmission U431. Subsequently, BS 102 receives the third HARQ-ACK codebook CB43 from UE 101.

Please refer to FIG. 6A further. For example, assuming two bits are used as DAI and number of PDSCHs of the first PDSCH group PG41 is three, the possible DAIs are {0, 1, 2, 3} and the DAIs are indicated to the PDSCHs of the first PDSCH group PG41 from minimum value "0" to value "2". As shown in FIG. 6A, the first PDSCH of the first PDSCH group PG41 is associated with the DAI A411 which is indicated to the minimum value "0" of possible DAIs, the second PDSCH of the first PDSCH group PG41 is associated with the DAT A412 which is indicated to next value "1" of possible DAIS, and the third PDSCH of the first PDSCH group PG41 is associated with the DAT A413 which is indicated to next value "2" of possible DAIs.

When BS 102 determines not to request UE 101 to retransmit the HARQ-ACK feedback for the first PDSCH group PG41, BS 102 indicates DAIs to the PDSCHs of the third PDSCH group PG43 from the minimum value "0" of possible DAIs. In other words, as shown in FIG. 6A, the first PDSCH of the third PDSCH group PG43 is associated with the DAI A431 which is indicated to the minimum value "0" of possible DAIs. Similarly, the second PDSCH of the third PDSCH group PG43 is associated with the DAT A432 which is indicated to next value "1" of possible DAIs, and the third PDSCH of the third PDSCH group PG43 is associated with the DAT A433 which is indicated to next value "2" of possible DAIs.

Next, BS 102 transmits the third PDSCH group PG43 to UE 101. Accordingly, when UE 101 receives the third PDSCH group PG43, UE 101 determines not to retransmit HARQ-ACK feedback for the first PDSCH group PG41 since the value "0" of the DAI A431 of the first PDSCH of the third PDSCH group PG43 is the minimum value of the possible DAIS.

In some embodiments, when BS 102 receives and decodes the first HARQ-ACK codebook CB41 successfully, BS 102 may indicate UE 101 to clear the first HARQ-ACID codebook CB41 from the buffer. Subsequently, UE 101 may clear the first HARQ-ACK codebook CB41 from the buffer.

Please refer to FIG. 6B. On the other hand, in some embodiments, when BS 102 fails to receive or decode the first HARQ-ACK codebook CB41 carried in the corresponding PUCCH during the transmission of the second PDSCH group PG42, BS 102 may determine to request UE 101 to retransmit the HARQ-ACK feedback for the first PDSCH group PG41. Then, BS 102 indicates a group index of the third PDSCH group PG43 same to the group index G41 of the first PDSCH group PG41 and indicates the DAT A431 to the first PDSCH of the third PDSCH group G43 from the value that follows the DAT A413 of the last PDSCH of the first PDSCH group PG41. BS 102 then transmits the third PDSCH group PG43 to UE 101 after transmitting the second PDSCH group PG42.

Accordingly, when UE 101 receives the third PDSCH group PG43, UE 101 may determine whether to retransmit HARQ-ACK feedback for the first PDSCH group PG41 according to the group index and the DAIs associated with the third PDSCH group PG43. In particular, because BS 102 indicates the group index G41 to the third PDSCH group PG43, it means that HARQ-ACK feedback of the first PDSCH group PG41 associated with the group index G41 may need to be retransmitted. Further, because BS 102 indicates the DAI A431 to the first PDSCH of the third PDSCH group G43 from the value that follows the DAI A413 of the last PDSCH of the first PDSCH group PG41, UE 101 retransmits HARQ-ACK feedback for the first PDSCH group PG41.

Next, UE 101 obtains a combined HARQ-ACK codebook CB44 for the first PDSCH group PG41 and the third. PDSCH group PG43 in response to determining to retransmit HARQ-ACK feedback for the first PDSCH group PG41. Then, UE 101 transmits the combined HARQ-ACK codebook CB44 to BS 102 in the corresponding PUCCH via the uplink transmission U431. Subsequently, BS 102 receives the combined HARQ-ACK codebook CB44 from UE 101. In some embodiments, the combined HARQ-ACK, codebook CB44 includes a first sub-codebook corresponding to the first PDSCH group PG41 and a second sub-codebook corresponding to the third PDSCH group PG43. In other words, the combined HARQ-ACK codebook CB44 includes the first HARQ-ACK codebook CB41 and the third HARQ-ACK codebook CB43.

In some embodiments, before obtaining the combined HARQ-ACK codebook CB44, UE 101 may perform a HARQ-ACK bundling operation by means of logic AND operation for the first HARQ-ACK codebook. CB41 based on a bundle size to generate one or more bundled HARQ-ACK bits. The bundle size may be preconfigured by high layer signaling or predefined in specification. Alternatively, the number of the bundled HARQ-ACK bits may be preconfigured by high layer signaling or predefined in specification. The first sub-codebook includes the one or more bundled HARQ-ACK bits for the first PDSCH group PG41. In some embodiments, the first sub-codebook and the second sub-codebook are encoded separately. In some embodiments, the first sub-codebook and the second sub-codebook are concatenated for joint encoding.

Please refer to FIG. 6B further. For example, when BS 102 determines to request UE 101 to retransmit the HARQ-ACK feedback for the first PDSCH group PG41, BS 102 indicates the group index G41 to the third PDSCH group PG43, and indicates a DAI value which follows the last PDSCH of the first PDSCH group PG41 to the first PDSCH of the third PDSCH group PG43. As shown in FIG. 6B, BS 102 indicates value "3" which follows value "2" of the DAI A413 of the last PDSCH of the first PDSCH group PG41 to the first PDSCH of the third PDSCH group PG43.

Next, BS 102 transmits the third PDSCH group PG43 to UE 101. Accordingly, when UE 101 receives the third PDSCH group PG43, UE 101 determines to retransmit HARQ-ACK feedback for the first PDSCH group PG41 since the group index G41, which is indicated to the third PDSCH group PG43, is associated with the first PDSCH group PG41, and the value "3" of the DAI A431 of the first PDSCH of the third PDSCH group PG43 follows the value "2" of the DAI A413 of the last PDSCH of the first PDSCH group PG41. UE 101 then obtains the combined HARQ-ACK codebook CB44 for the first PDSCH group PG41 and the third PDSCH group PG43 and transmits the combined HARQ-ACK codebook CB44 to BS 102.

In some embodiments, when BS 102 receives and decodes the combined codebook CB44 successfully, BS 102 may indicate UE 101 to clear the first HARQ-ACK codebook CB41, which is included in the combined HARQ-ACK codebook CB44, from the buffer. Subsequently, UE 101 may clear the first HARQ-ACK codebook CB41 from the buffer.

In some embodiments, each downlink transmission of the second PDSCH group PG43 is associated with one DCI scheduling the corresponding downlink transmission. In these embodiments, at least one DCI associated with one downlink transmission includes an indicator. The indicator may be used for indicating the second HARQ-ACK codebook CB42 for the second PDSCH group PG42 of downlink transmissions to be suspended. This indicator may be an invalid PDSCH-to-HARQ timing indicator or PUCCH resource indicator or a dedicated bit field, preconfigured by high layer signaling. This indicator may be sent to UE 101 when BS 102 schedules new PDSCHs in the second PDSCH group PG42 to UE 101 before BS 102 finishes the decoding of the first HARQ-ACK codebook CB41 for the first PDSCH group PG41. After finishing the decoding of the first HARQ-ACK codebook CB41, BS 102 may indicate another indicator in at least one DCI scheduling one downlink transmission in the second PDSCH group PG42 to trigger UE 101 to transmit the second HARQ-ACK codebook CB42 for the second PDSCH group PG42 in response to BS 102 has successfully decoded the first HARQ-ACK codebook CB41, or the combined HARQ-ACK codebook of CB41 and CB42 in response to BS 102 has not successfully decoded the first HARQ-ACK codebook CB41. The another indicator may be a valid PDSCH-to-HARQ timing indicator or PUCCH resource indicator or a dedicated bit field, preconfigured by high layer signaling.

It should be noted that, in some embodiments, for each downlink transmission, there may be a HARQ-ACK feedback from UE to BS. Accordingly, for each downlink transmission, the corresponding DCI may include a HARQ timing indicator which is used for BS to indicate to UE a slot (i.e., a PUCCH) where the corresponding HARQ-ACK feedback may be transmitted. Further, the downlink transmissions, which have the corresponding HARQ-ACK feedback being indicated in the same PUCCH, may be grouped in a same group. In other words, the HARQ-ACK feedbacks for the downlink transmissions of the same PDSCH group are indicated to be transmitted in a same uplink transmission via a corresponding PUCCH.

One benefit of introducing DAT for determining whether to retransmit the HARQ-ACK codebook is that one bit may be enough for a group index. As shown in FIG. 6B, based on whether DAT of the same PDSCH group starts from the minimum value or not, UE 101 may derive whether the retransmission of HARQ-ACK codebook for same PDSCH group is needed or not.

Figure 7:
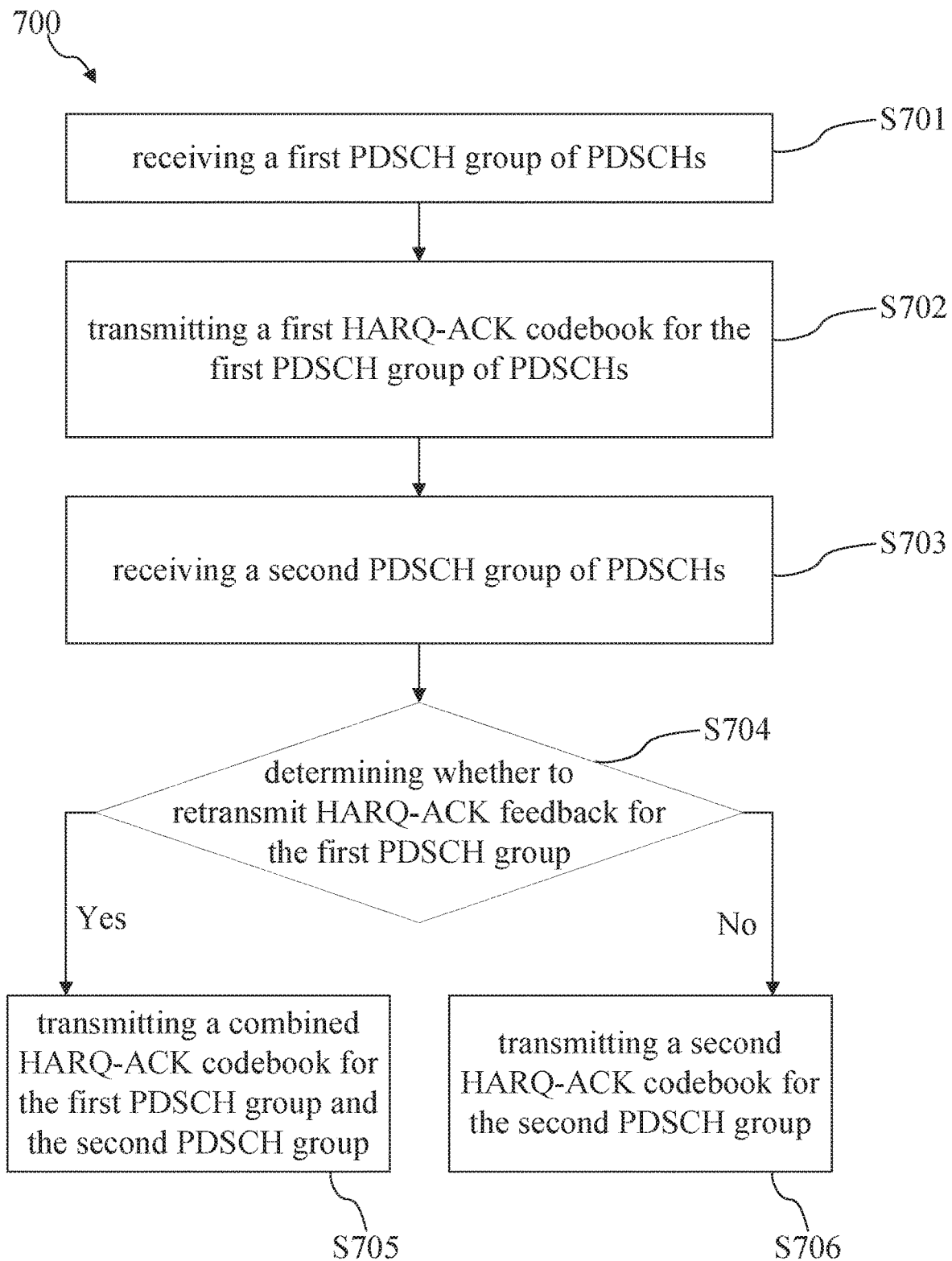
FIG. 7 illustrates a flow chart of a method for wireless communications in accordance with some embodiments of the present application.

FIG. 7 illustrates a flow chart of a method for wireless communications in accordance with some embodiments of the present application. Referring to FIG. 7, method 700 is performed by a UE (e.g., t JE 101) in some embodiments of the present application.

In operation S701, the UE receives a first PDSCH group of PDSCHs from a BS (e.g., BS 102). In operation S702, the UE transmits, to the BS, a first HARQ-ACK codebook for the first PDSCH group of PDSCHs in response to channel access procedure for transmitting the first HARQ-ACK codebook being successful. In operation S703, the UE receives a second PDSCH group of PDSCHs from the BS. In operation S704, the UE determines whether to retransmit, to the BS, HARQ-ACK feedback for the first PDSCH group of PDSCHs.

In operation S705, the UE transmits, to the BS, a combined HARQ-ACK codebook in response to determining to retransmit the HARQ-ACK feedback for the first PDSCH group of PDSCH and channel access procedure for transmitting the combined HARQ-ACK codebook being successful. The combined HARQ-ACK codebook includes a first sub-codebook corresponding to the first PDSCH group of PDSCHs and a second sub-codebook corresponding to the second PDSCH group of PDSCHs.

In operation S706, the UE transmits, to the BS, a second HARQ-ACK codebook for the second PDSCH group of PDSCHs in response to determining not to retransmit the HARQ-ACK feedback for the first PDSCH group of PDSCHs and channel access procedure for transmitting the second HARQ-ACK codebook being successful.

Details described in all the foregoing embodiments of the present application are applicable for the embodiments as shown in FIG. 7.

Figure 8:
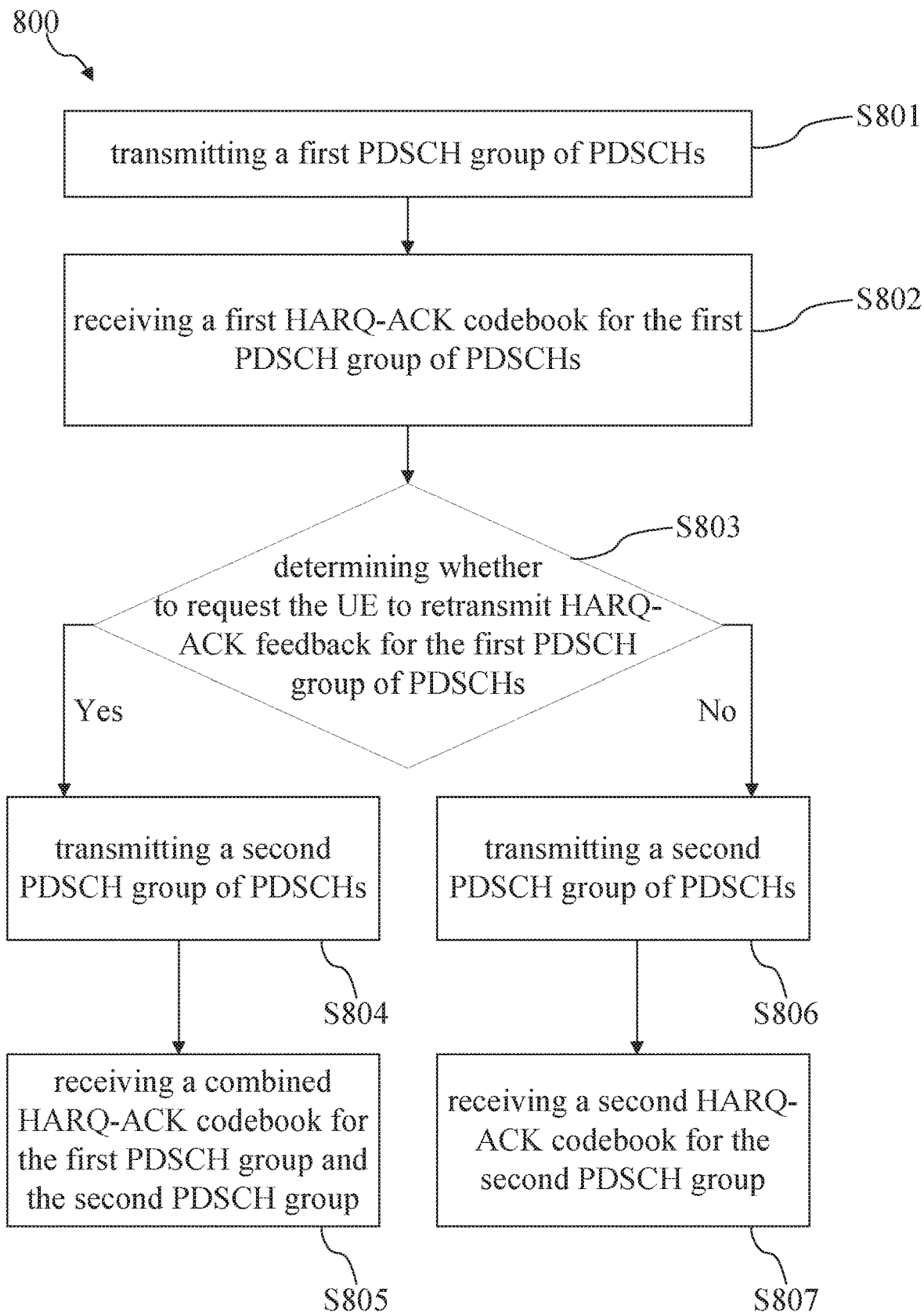
FIG. 8 illustrates a flow chart of a method for wireless communications in accordance with some embodiments of the present application

FIG. 8 illustrates a flow chart of a method for wireless communications in accordance with some embodiments of the present application. Referring to FIG. 8, method 800 is performed by a BS (e.g., BS 102) in some embodiments of the present application.

In operation S801, the BS transmits a first PDSCH group of PDSCHs to a UE (e.g., UE 101). In operation S802, the BS receives a first HARQ-ACK codebook for the first PDSCH group of PDSCHs from the UE. In operation S803, the BS determines whether to request the UE to retransmit HARQ-ACK feedback for the first PDSCH group of PDSCH.

In operation S804, when the BS determines to request the UE to retransmit HARQ-ACK feedback for the first PDSCH group of PDSCH, the BS transmits a second. PDSCH group of PDSCHs to the UE. In operation S805, the BS receives, from the UE, a combined HARQ-ACK codebook in response to determining to request the UE to retransmit HARQ-ACK feedback for the first PDSCH group of PDSCHs. The combined HARQ-ACK codebook includes a first sub-codebook corresponding to the first PDSCH group of PDSCHs and a second sub-codebook corresponding to the second PDSCH group of PDSCHs.

In operation S806, when the BS determines not to request the UE to retransmit HARQ-ACK feedback for the first PDSCH group of PDSCH, the BS transmits the second PDSCH group of PDSCHs to the UE. In operation S807, the BS receives, from the UE, a second HARQ-ACK codebook for the second PDSCH group of PDSCHs in response to determining not to request the UE to retransmit HARQ-ACK feedback for the first PDSCH group of PDSCHs.

Details described in all the foregoing embodiments of the present application are applicable for the embodiments as shown in FIG. 8.

Figure 9:
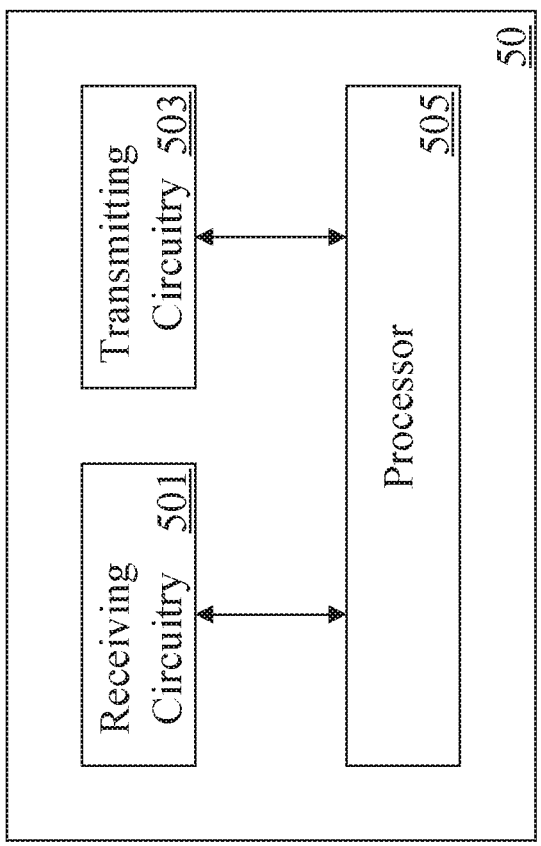
FIG. 9 illustrates an example block diagram of an apparatus according to an embodiment of the present disclosure.

FIG. 9 illustrates an example block diagram of an apparatus 50 according to an embodiment of the present disclosure.

As shown in FIG. 9, the apparatus 50 may include at least one non-transitory computer-readable medium (not illustrated in FIG. 9), a receiving circuitry 501, a transmitting circuitry 503, and a processor 505 coupled to the non-transitory computer-readable medium (not illustrated in FIG. 9), the receiving circuitry 501 and the transmitting circuitry 503. The apparatus 50 may be a base station or a user equipment.

Although in this figure, elements such as processor 505, transmitting circuitry 503, and receiving circuitry 501 are described in the singular, the plural is contemplated unless limitation to the singular is explicitly stated. In some embodiments of the present disclosure, the receiving circuitry 501 and the transmitting circuitry 503 are combined into a single device, such as a transceiver. In certain embodiments of the present disclosure, the apparatus 50 may further include an input device, a memory, and/or other components.

In some embodiments of the present disclosure, the non-transitory computer-readable medium may have stored thereon computer-executable instructions to cause a processor to implement the method with respect to the base station as described above. For example, the computer-executable instructions, when executed, cause the processor 505 interacting with receiving circuitry 501 and transmitting circuitry 503, so as to perform the operations with respect to BS depicted in FIG. 1.

In some embodiments of the present disclosure, the non-transitory computer-readable medium may have stored thereon computer-executable instructions to cause a processor to implement the method with respect to the user equipment as described above. For example, the computer-executable instructions, when executed, cause the processor 50 interacting with receiving circuitry 501 and transmitting circuitry 503, so as to perform the operations with respect to UE depicted in FIG. 1.

Those having ordinary skill in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

We claim:

1. A method for wireless communications by a user equipment, the method comprising:
   receiving a first group of downlink transmissions;
   transmitting a first hybrid automatic repeat request acknowledgement codebook for the first group of downlink transmissions in response to channel access procedure for transmitting the first hybrid automatic repeat request acknowledgement codebook being successful;
   receiving a second group of downlink transmissions;
   determining whether to retransmit hybrid automatic repeat request acknowledgement feedback for the first group of downlink transmissions;
   transmitting a combined hybrid automatic repeat request acknowledgement codebook in response to determining to retransmit the hybrid automatic repeat request acknowledgement feedback for the first group of downlink transmissions and channel access procedure for transmitting the combined hybrid automatic repeat request acknowledgement codebook being successful, wherein the combined hybrid automatic repeat request acknowledgement codebook includes a first sub-codebook corresponding to the first group of downlink transmissions and a second sub-codebook corresponding to the second group of downlink transmissions; and
   transmitting a second hybrid automatic repeat request acknowledgement codebook for the second group of downlink transmissions in response to determining not to retransmit the hybrid automatic repeat request acknowledgement feedback for the first group of downlink transmissions and channel access procedure for transmitting the second hybrid automatic repeat request acknowledgement codebook being successful.

2. The method of claim 1, wherein each downlink transmission of the first group of downlink transmissions and the second group of downlink transmissions is associated with a group index and each group index is included in a downlink control information scheduling the associated downlink transmission.

3. The method of claim 2, wherein the downlink transmissions are grouped into a same group in response to the respective group index being same.

4. The method of claim 2, wherein the group index is incremented from one group to a next group.

5. The method of claim 1, wherein determining whether to retransmit the hybrid automatic repeat request acknowledgement feedback for the first group of downlink transmissions comprises:
   determining to retransmit the hybrid automatic repeat request acknowledgement feedback for the first group of downlink transmissions in response to a group index of the second group of downlink transmissions being same to a group index of the first group of downlink transmissions;
   determining not to retransmit the hybrid automatic repeat request acknowledgement feedback for the first group of downlink transmissions in response to the group index of the second group of downlink transmissions being different to the group index of the first group of downlink transmissions.

6. The method of claim 1, further comprising:
   receiving a third group of downlink transmissions before receiving the second group of downlink transmissions;
   transmitting a third hybrid automatic repeat request acknowledgement codebook for the third group of downlink transmissions in response to channel access procedure for transmitting the third hybrid automatic repeat request acknowledgement codebook being successful, wherein the third group is associated with different group index from a group index of the first group and a group index of the second group.

7. The method of claim 1, wherein determining whether to retransmit the hybrid automatic repeat request acknowledgement feedback for the first group of downlink transmissions comprises:
   determining to retransmit hybrid automatic repeat request acknowledgement feedback for the first group of downlink transmissions in response to at least one downlink transmission of the second group of downlink transmissions indicating a group index of the first group of downlink transmissions;
   determining not to retransmit the hybrid automatic repeat request acknowledgement feedback for the first group of downlink transmissions in response to none of the second group of downlink transmissions indicating the group index of the first group of downlink transmissions.

8. The method of claim 1, wherein at least one downlink control information scheduling one downlink transmission of the second group of downlink transmissions includes an indicator indicating that hybrid automatic repeat request acknowledgement feedback transmission for the second group of downlink transmissions is to be suspended.

9. The method of claim 1, wherein each downlink transmission of the first group of downlink transmissions and the second group of downlink transmissions is associated with a downlink assignment index (DAI) and the downlink assignment index is accumulated within one group.

10. The method of claim 1, wherein determining whether to retransmit the hybrid automatic repeat request acknowledgement feedback for the first group of downlink transmissions comprises:
determining to retransmit the hybrid automatic repeat request acknowledgement feedback for the first group of downlink transmissions in response to a downlink assignment index of a first downlink transmission of the second group of downlink transmissions following a downlink assignment index of a last downlink transmission of the first group of downlink transmissions;
determining not to retransmit hybrid automatic repeat request acknowledgement feedback for the first group of downlink transmissions in response to a downlink assignment index of the first downlink transmission of the second group of downlink transmissions being the minimum value of values of downlink assignment index.

11. The method of claim 1, further comprising:
receiving a third group of downlink transmissions before receiving the second group of downlink transmissions;
transmitting a third hybrid automatic repeat request acknowledgement codebook for the third group of downlink transmissions in response to channel access procedure for transmitting the third hybrid automatic repeat request acknowledgement codebook being successful, wherein a downlink assignment index of a first downlink transmission of the third group of downlink transmissions being the minimum value of values of downlink assignment index.

12. The method of claim 1, further comprising:
clearing the first hybrid automatic repeat request acknowledgement codebook from a buffer in response to the channel access procedure for transmitting the first hybrid automatic repeat request acknowledgement codebook being successful and determining not to retransmit the hybrid automatic repeat request acknowledgement feedback for the first group of downlink transmissions after receiving the second group of downlink transmissions.

13. The method of claim 1, further comprising:
performing a hybrid automatic repeat request acknowledgement bundling operation for the first hybrid automatic repeat request acknowledgement codebook based on a bundle size, to generate one or more bundled hybrid automatic repeat request acknowledgement bits;
wherein a first sub-codebook comprises the one or more bundled hybrid automatic repeat request acknowledgement bits for the first group of downlink transmissions.

14. A method for wireless communications by a base station, the method comprising:
transmitting, to a user equipment, a first group of downlink transmissions;
receiving, from the user equipment, a first hybrid automatic repeat request acknowledgement codebook for the first group of downlink transmissions;
determining whether to request the user equipment to retransmit hybrid automatic repeat request acknowledgement feedback for the first group of downlink transmissions;
transmitting, to the user equipment, a second group of downlink transmissions;
receiving, from the user equipment, a combined hybrid automatic repeat request acknowledgement codebook in response to determining to request the user equipment to retransmit hybrid automatic repeat request acknowledgement feedback for the first group of downlink transmissions, wherein the combined hybrid automatic repeat request acknowledgement codebook includes a first sub-codebook corresponding to the first group of downlink transmissions and a second sub-codebook corresponding to the second group of downlink transmissions; and
receiving, from the user equipment, a second hybrid automatic repeat request acknowledgement codebook for the second group of downlink transmissions in response to determining not to request the user equipment to retransmit hybrid automatic repeat request acknowledgement feedback for the first group of downlink transmissions.

15. The method of claim 14, wherein determining whether to request the user equipment to retransmit the hybrid automatic repeat request acknowledgement feedback for the first group of downlink transmissions comprises:
determining to request the user equipment to retransmit the hybrid automatic repeat request acknowledgement feedback for the first group of downlink transmissions in response to the receiving of the first hybrid automatic repeat request acknowledgement codebook being failed;
determining not to request the user equipment to retransmit the hybrid automatic repeat request acknowledgement feedback for the first group of downlink transmissions in response to the receiving of the first hybrid automatic repeat request acknowledgement codebook being successful.

16. The method of claim 14, wherein each downlink transmission of the first group of downlink transmissions and the second group of downlink transmissions is associated with a group index and each group index of is included in downlink control information scheduling the associated downlink transmission, and wherein a same group index is indicated for the user equipment to group the corresponding downlink transmissions into a same group.

17. The method of claim 14, further comprising:
indicating a group index of the second group of downlink transmissions same to a group index of the first group of downlink transmissions in response to determining to request the user equipment to retransmit the hybrid automatic repeat request acknowledgement feedback for the first group of downlink transmissions;
indicating the group index of the second group of downlink transmissions different to the group index of the first group of downlink transmissions in response to determining not to request the user equipment to retransmit hybrid automatic repeat request acknowledgement feedback for the first group of downlink transmissions.

18. The method of claim 14, further comprising:
indicating at least one downlink transmission of the second group of downlink transmissions with same group index to the first group of downlink transmissions in response to determining to request the user equipment to retransmit hybrid automatic repeat request acknowledgement feedback for the first group of downlink transmissions;
indicating all downlink transmissions of the second group of downlink transmissions with different group index to the group index of the first group of downlink transmissions in response to determining not to request the user equipment to retransmit hybrid automatic repeat request acknowledgement feedback for the first group of downlink transmissions.

19. The method of claim 14, further comprising:
indicating the user equipment to clear the first hybrid automatic repeat request acknowledgement codebook from a buffer, in response to the receiving of the first hybrid automatic repeat request acknowledgement codebook being successful; or
in response to the receiving of the combined hybrid automatic repeat request acknowledgement codebook being successful, wherein the combined hybrid automatic repeat request acknowledgement codebook includes the first sub-codebook and the second sub-codebook.

20. An apparatus comprising a user equipment for wireless communications, the apparatus further comprising:
a receiver that receives a first group of downlink transmissions;
a transmitter that transmits a first hybrid automatic repeat request acknowledgement codebook for the first group of downlink transmissions in response to channel access procedure for transmitting the first hybrid automatic repeat request acknowledgement codebook being successful; and
a processor, wherein:
the receiver receives a second group of downlink transmissions;
the processor determines whether to retransmit hybrid automatic repeat request acknowledgement feedback for the first group of downlink transmissions;
the transmitter transmits a combined hybrid automatic repeat request acknowledgement codebook in response to determining to retransmit the hybrid automatic repeat request acknowledgement feedback for the first group of downlink transmissions and channel access procedure for transmitting the combined hybrid automatic repeat request acknowledgement codebook being successful, wherein the combined hybrid automatic repeat request acknowledgement codebook includes a first sub-codebook corresponding to the first group of downlink transmissions and a second sub-codebook corresponding to the second group of downlink transmissions; and
the transmitter transmits a second hybrid automatic repeat request acknowledgement codebook for the second group of downlink transmissions in response to determining not to retransmit the hybrid automatic repeat request acknowledgement feedback for the first group of downlink transmissions and channel access procedure for transmitting the second hybrid automatic repeat request acknowledgement codebook being successful.

* * * * *